United States Patent [19]

Harms et al.

[11] Patent Number: 4,676,803
[45] Date of Patent: Jun. 30, 1987

[54] REACTIVE AZO DYESTUFFS, FREE FROM ANIONIC GROUPS AND CONTAINING A BASIC GROUP AND HALOGENOTRIAZINYL RADICAL AND USEFUL FOR DYEING CELLULOSE/POLYESTER

[75] Inventors: Wolfgang Harms, Leverkusen; Robert Kuth, Cologne; Klaus Wunderlich, Leverkusen, all of Fed. Rep. of Germany

[73] Assignee: Bayer Aktiengesellschaft, Leverkusen, Fed. Rep. of Germany

[21] Appl. No.: 863,220

[22] Filed: May 14, 1986

Related U.S. Application Data

[60] Division of Ser. No. 760,212, Jul. 29, 1985, abandoned, which is a continuation of Ser. No. 461,295, Jan. 27, 1983, abandoned, which is a division of Ser. No. 159,747, Jun. 16, 1980, Pat. No. 4,503,224.

[51] Int. Cl.$^4$ .................... C09B 62/04; D06P 1/38; D06P 3/66; C07D 251/50
[52] U.S. Cl. .................................. 8/532; 8/529; 8/549; 8/688; 8/690; 8/692; 8/918; 8/919; 8/922; 544/187; 544/189; 534/604; 534/632
[58] Field of Search ............ 8/529, 549, 654, 657, 8/532

[56] References Cited

U.S. PATENT DOCUMENTS

| | | | |
|---|---|---|---|
| 3,116,275 | 12/1963 | Gamlen et al. | 534/638 |
| 3,974,160 | 8/1976 | Seiler et al. | 534/632 |
| 4,038,267 | 7/1977 | Sueda et al. | 534/636 |
| 4,148,790 | 4/1979 | Sueda et al. | 534/724 |
| 4,171,955 | 10/1979 | Perrin et al. | 8/566 |
| 4,180,664 | 12/1979 | Perrin et al. | 8/566 |
| 4,230,852 | 10/1980 | Sueda et al. | 544/189 |
| 4,246,670 | 1/1981 | Perrin et al. | 8/566 |
| 4,261,889 | 4/1981 | Seiler et al. | 534/631 |
| 4,503,224 | 3/1985 | Harms et al. | 544/187 |

FOREIGN PATENT DOCUMENTS 50-161522 12/1975 Japan.

*Primary Examiner*—A. Lionel Clingman
*Attorney, Agent, or Firm*—Sprung Horn Kramer & Woods

[57] ABSTRACT

The invention is directed to reactive azo dyestuffs, free from anionic groups and which contain a basic group and a halogenotriazinyl radical and are of the general formula

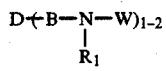

in which
D is the radical of an organic azo dyestuff which is free from anionic groups and is preferably free from basic groups,
B is a direct bond or a bridge member to a ring C atom of D,
$R_1$ is H, alkyl, aralkyl or aryl and
W is a halogenotriazinyl radical containing a basic group; the dyestuffs are useful for the dyeing and printing of fibre materials containing cellulose.

4 Claims, No Drawings

REACTIVE AZO DYESTUFFS, FREE FROM ANIONIC GROUPS AND CONTAINING A BASIC GROUP AND HALOGENOTRIAZINYL RADICAL AND USEFUL FOR DYEING CELLULOSE/POLYESTER

This is a division, of application Ser. No. 760,212, filed 7/29/85 which is continuation of Ser. No. 461,295 filed 1/27/83 (abandoned) which is division of 159,747 filed June 16, 1980 (now U.S. Pat. No. 4,503,224).

The present invention relates to reactive dyestuffs which are free from anionic groups, in particular sulpho and carboxyl groups, and contain a basic group and a halogenotriazinyl radical.

Possible basic groups are, for example, primary, secondary or tertiary amino groups, in particular alkylamino groups, or salts thereof, as well as hydrazino and hydrazinium groups and quaternary ammonium groups.

The dyestuffs can contain one or more basic groups and one or more halogenotriazinyl radicals, and can optionally contain other reactive groups.

The basic group can be linked to the chromophore directly or via a bridge member. It can also be, for example, a constituent of a substituent on the triazine ring. Amino groups which are linked directly to the triazine ring are not basic groups in the context of the invention. Hydrazino or hydrazinium groups, however, are considered basic groups.

Preferred dyestuffs correspond to the following formulae

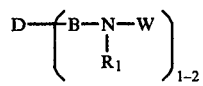  (I)

in which
D denotes the radical of an organic dyestuff which is free from anionic groups and is preferably free from basic groups,
B denotes a direct bond or a bridge member to a ring C atom of D,
$R_1$ denotes H, alkyl, aralkyl or aryl and
W denotes a halogenotriazinyl radical containing a basic group,
wherein halogen denotes F, Cl or Br, and

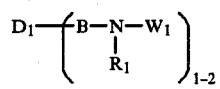  (II)

in which
$D_1$ denotes the radical of an organic dyestuff which is free from anionic groups and contains a basic group and
$W_1$ denotes a halogenotriazinyl radical which is free from basic groups.

Examples of suitable basic groups which can be a constituent of D, $D_1$ or W are

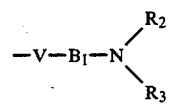  (III)

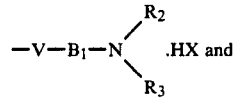  (IIIa)

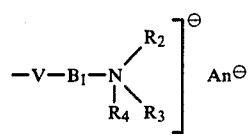  (IV)

in which
V denotes

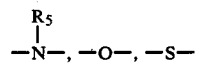

or a direct bond,
$B_1$ denotes a bridge member, in particular $C_2$–$C_8$-alkylene, optionally interrupted by hetero-atoms, in particular —O—, aralkylene, alkarylene or alkarylalkylene, or, if

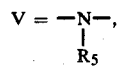

also a direct bond,
$R_2$, $R_3$, $R_4$ and $R_5$ denote H or alkyl and $R_2$ and $R_5$ together can also denote alkylene,
An$^\ominus$ denotes an anion and
HX denotes an organic or inorganic acid.
Suitable radicals $W_1$ are those of the formula

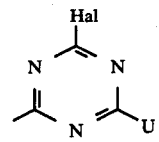  (V)

in which U denotes the radical of an amine, alcohol or thiol or an alkyl, aryl or aralkyl radical, in particular

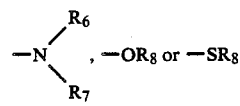

in which
$R_6$, $R_7$ and $R_8$ denote H, alkyl, aralkyl or aryl and
$R_6$ and $R_7$ together can also be a constituent of a 5-membered or 6-membered ring.

Preferred radicals W are fluorotriazinyl radicals containing one radical of the formula (III), (IIIa) or (IV), in particular those containing a radical

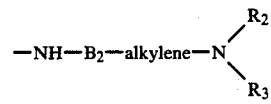  (VI)

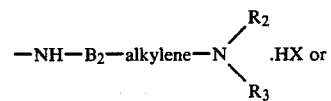  (VIa)

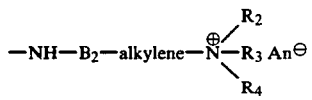 (VII)

in which

B₂ denotes a direct bond, phenylene or phenylene—O— and alkylene denotes $C_2$-$C_8$-alkylene.

Anions $An^\ominus$ which are particularly suitable are those of highly volatile inorganic acids, such as hydrogen halide acids, or of organic acids, such as formic acid, acetic acid, propionic acid, chloroacetic acid, acrylic acid and oxalic acid.

The abovementioned acids are examples of suitable acids HX. The following are preferred: acetic acid, formic acid, propionic acid and hydrochloric acid.

Suitable dyestuffs are, for example, azo dyestuffs, anthraquinone dyestuffs, phthalocyanine dyestuffs, quinophthalone dyestuffs, phthaloperinone dyestuffs, nitro dyestuffs and formazan dyestuffs, in particular those of the formula

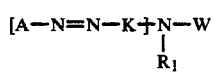 (VIII)

wherein

A denotes the radical of a diazo component and

K denotes the radical of a coupling component, in particular those of the formula

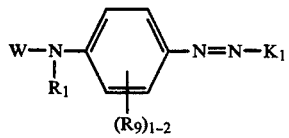 (IX)

or

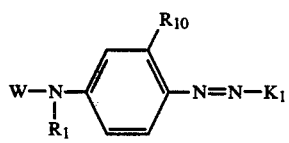 (X)

in which

R₉ denotes a substituent or H,

R₁₀ denotes H, NO₂, halogen, in particular Cl or Br, or CN and

K₁ denotes

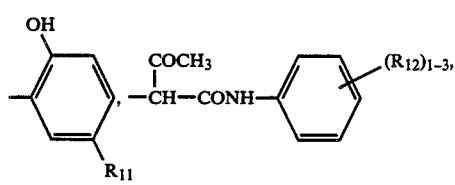

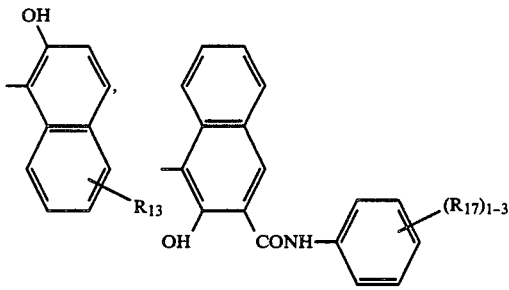

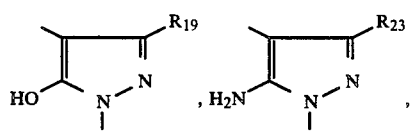

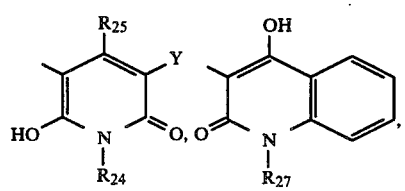

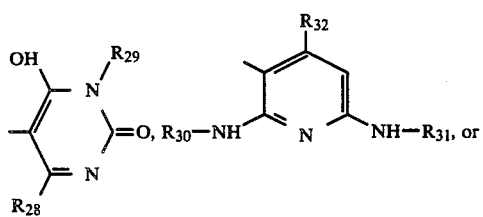

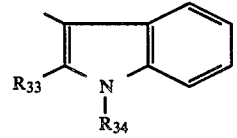

in which

R₁₁ denotes alkyl, phenyl or cyclohexyl,

R₁₂ denotes H, alkyl, alkoxy or halogen, in particular Cl,

R₁₃ denotes H or sulphonamido, in particular

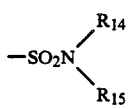

in which R₁₄ and R₁₅ denote H, alkyl, aralkyl, aryl or a carboxylic acid ester group, in particular —COOR₁₆, in which R₁₆ denotes alkyl or aralkyl, and R₁₇ denotes H, alkyl, alkoxy or halogen, in particular Cl, R₁₈ denotes H, alkyl or aryl, R₁₉ denotes alkyl, in particular CH₃, carboxylic acid ester, in particular —COO-alkyl, carboxamido, in particular

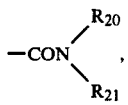

or CN,

R$_{20}$ and R$_{21}$ denote H, alkyl or aralkyl,
R$_{22}$ denotes H, alkyl, aralkyl or aryl,
R$_{23}$ denotes H, alkoxy or R$_{19}$,
R$_{24}$ denotes H or alkyl,
R$_{25}$ denotes H, OH or alkyl, in particular CH$_3$,
Y denotes CN or carboxamido, in particular CONHR$_{26}$,
R$_{26}$ denotes H, alkyl or aryl,
R$_{27}$ denotes H or alkyl,
R$_{28}$ denotes OH or NH$_2$,
R$_{29}$ denotes alkyl or aryl,
R$_{30}$ denotes H or alkyl,
R$_{31}$ denotes alkyl or aralkyl,
R$_{32}$ denotes H, alkyl or —NHR$_{31}$ and
R$_{33}$ and R$_{34}$ denote H, alkyl or aryl.

Other particularly suitable dyestuffs are those of the formula

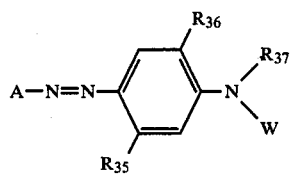

wherein

A denotes the radical of a diazo component,
R$_{35}$ denotes H, alkyl, alkoxy, halogen, in particular Cl, or acylamino,
R$_{36}$ denotes H, alkyl, alkoxy or halogen, in particular Cl, and
R$_{37}$ denotes H, alkyl or aralkyl,

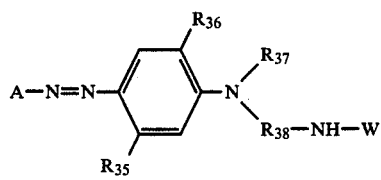

wherein R$_{38}$ denotes a bridge member, in particular C$_2$-C$_6$-alkylene and especially —CH$_2$—CH$_2$—, and

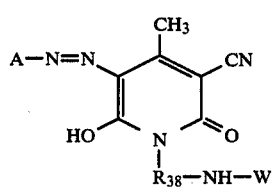

and

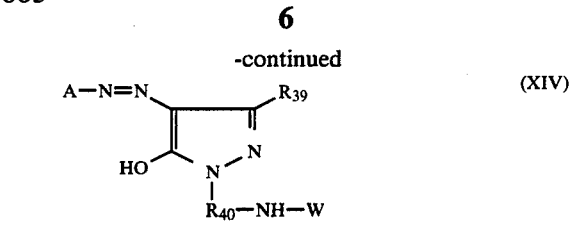

wherein

R$_{39}$ denotes alkyl, in particular CH$_3$, carboxylic acid ester, in particular —COO-alkyl, or carboxamido, in particular

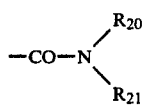

and

R$_{40}$ denotes arylene or alkylene, in particular C$_2$-C$_6$-alkylene.

Particularly suitable radicals A are the following:

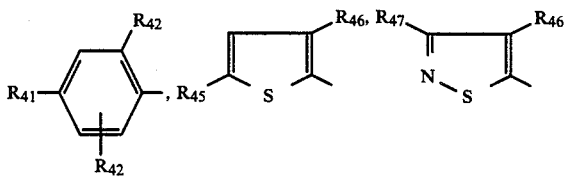

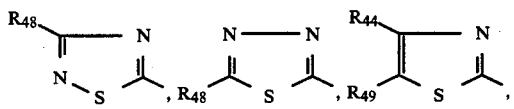

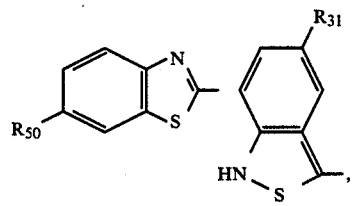

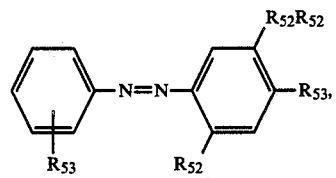

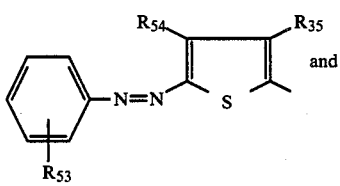

-continued (structure with phenyl-N=N-thiophene bearing $R_{54}$, $R_{53}$, and methyl) (5)

wherein $R_{41}$ denotes $R_{42}$ or acyl, in particular alkyl-, aralkyl- or aryl-carbonyl, $R_{42}$ denotes H, CN, $NO_2$, alkyl, alkoxy, halogen, $CF_3$, alkyl-, aralkyl- or aryl-sulphonyl, carboxylic acid ester, in particular alkoxycarbonyl or aralkoxycarbonyl, or sulphonamido, in particular $$SO_2-N\begin{matrix}R_{43}\\R_{44}\end{matrix},$$

wherein $R_{43}$ and $R_{44}$ denote H, alkyl, aralkyl or aryl, and $R_{45}$ denotes H, CHO, SCN or alkoxy- or aralkoxycarbonyl, $R_{46}$ denotes CN, alkoxycarbonyl or aralkoxycarbonyl, $R_{47}$ denotes H or alkyl-, aralkyl-, or arylsulphonyl, $R_{48}$ denotes alkyl, aryl, S-alkyl or S-aryl, $R_{49}$ denotes H, alkyl, aryl or alkoxy- or aralkoxy-carbonyl, $R_{50}$ denotes halogen, SCN, $NO_2$ or alkyl-, aralkyl- or aryl-sulphonyl, $R_{51}$ denotes H or halogen, $R_{52}$ denotes H, alkyl or alkoxy, $R_{53}$ denotes H, alkyl, alkoxy, halogen, acylamino or alkoxy- or aralkoxy-carbonyl, $R_{54}$ denotes H or alkyl and $R_{55}$ denotes CN or alkoxy- or aralkoxy-carbonyl.

Further suitable dyestuffs are those of the formulae (XV)

(quinoline-based structure with OH, NH-W groups)

(XVI)

(W-NH-phenyl-naphthalene bisimide structure)

and

-continued (XVII)

(benzimidazole-naphthalene structure with NH-W at 4'/5'-position)

and anthraquinones of the formula (XVIII)

(anthraquinone with NH—(B_3—N(R_1))_{0-1}—W, $R_{56}$, $R_{57}$ substituents)

wherein $R_{56}$ is preferably in the 4- or 5-position and denotes H, $NH_2$, alkylcarbonylamino, arylcarbonylamino, alkylamino, cycloalkylamino, arylamino, OH, alkoxy, arylthio or nitro, $R_{57}$ denotes H, alkoxy, aryloxy, nitro, halogen, cyano, alkylsulphonyl, arylsulphonyl, alkylcarbonyl, arylcarbonyl, alkoxycarbonyl, alkoxysulphonyl, aralkoxysulphonyl or aryloxysulphonyl and $B_3$ denotes a bridge member, preferably alkylene or arylene, (XIX)

(anthraquinone with $R_{58}$, O—$B_3$—N($R_1$)—W, $R_{59}$ substituents)

wherein $R_{58}$ denotes $NH_2$ or OH and $R_{59}$ denotes $NH_2$, alkylamino, cycloalkylamino, aralkylamino, arylamino, OH, alkylsulphonylamino, aralkylsulphonylamino, arylsulphonylamino, alkylcarbonylamino, aralkylcarbonylamino or arylcarbonylamino, and (XX)

(anthraquinone with $R_{60}$, NH-W, $R_{61}$, $R_{62}$ substituents)

wherein $R_{60}$, $R_{61}$ and $R_{62}$ denote H, OH, $NH_2$, alkylamino, arylamino or arylthio.

Preferred examples are those in which
$R_{61}$ and $R_{62}$ denote OH and
$R_{60}$ does not denote OH, or
$R_{60}$ and $R_{61}$ denote OH and
$R_{62}$ does not denote OH.

Quite generally, the alkyl, alkoxy, aryl and aralkyl radicals can optionally contain further customary substituents. Preferred alkyl and alkoxy radicals contain 1–4C atoms, preferred aryl is optionally substituted phenyl and preferred arylene is optionally substituted phenylene.

Dyestuffs which are generally preferred within the context of those claimed, in particular within the context of the dyestuffs VIII–XX, are those containing fluorotriazinyl radicals, especially those containing the groups VI, VIa and VII.

Other suitable dyestuffs are those of the formulae VIII–XX which contain $W_1$ instead of W and in which the group is on the chromophore.

The dyestuffs can be obtained by various processes:

(1) Reaction of dihalogenotriazinyl dyestuffs

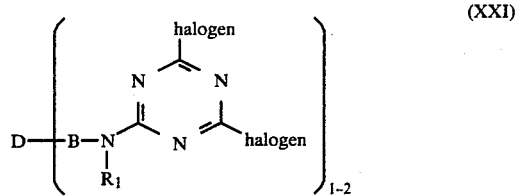

(XXI)

with compounds which contain a basic group and in addition a H atom which can react with halogen, in particular compounds of the formula

(XXII)

(XXIII)

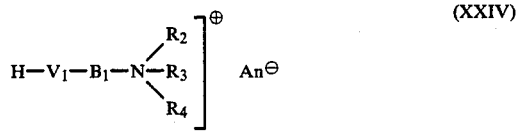

(XXIV)

in which $V_1$ denotes

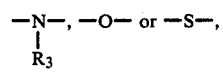

it being possible, in the case where XXII or XXIII is used, subsequently to carry out a quaternising step to introduce $R_4$ and, in the case where XXII is used, to subject the product to salt formation with HX.

Examples of suitable compounds XXII–XXIV are: 1-amino-2-dimethylaminoethane, 1-amino-2-diethylaminoethane, 1-amino-2-N-methyl-N-propylaminoethane, 1-amino-2-dipropylaminoethane, 1-amino-2-dibutylaminoethane, 1-amino-2-diisobutylaminoethane, 1-methyl-2-dimethylaminoethane, 1-methylamino-2-diethylaminoethane, 1-ethylamino-2-diethylaminoethane, 1-propylamino-2-diethylaminoethane, 1-butylamino-2-diethylaminoethane, 1-methylamino-2-dibutylaminoethane, 1-amino-2-bis-β-hydroxyethylaminoethane, 1-amino-2-N-methyl-N-β-hydroxyethylaminoethane, 1-β-hydroxyethylamino-2-diethylaminoethane, 1-amino-3-dimethylaminopropane, 1-amino-3-diethylaminopropane, 1-amino-3-dipropylaminopropane, 1-amino-3-(N-methyl-N-β-hydroxyethylamino)-propane, 1-amino-3-dibutylaminopropane, 1-methylamino-3-diethylaminopropane, 1-methylamino-3-dipropylaminopropane, 1-amino-3-N-methyl-N-isopropylaminopropane, 1-amino-3-N-methyl-N-isobutylaminopropane, 1-amino-3-diisobutylaminopropane, 2-amino-1-diethylaminopropane, 1-amino-3-dimethylaminobutane, 1-dimethylamino-3-methylaminobutane, 3-amino-1-diethylaminobutane, 1-amino-4-dimethylaminobutane, 1-methylamino-4-dimethylaminobutane, 1-amino-4-N-methyl-N-ethylaminobutane, 1-methylamino-4-diethylaminobutane, 1-amino-2-dimethylamino-2-methylpropane, 1-amino-5-dimethylaminopentane, 1-amino-5-diethylaminopentane, 1-amino-6-diethylaminohexane, bis-(2-diethylamino-1-propyl)-amine, N-methylpiperazine, N-hydroxyethylpiperazine, N-(β-aminoethyl)-morpholine, N-methyl-N'-(β-aminoethyl)piperazine, 2-, 3- or 4-aminobenzyl-dimethylamine, 2- or 4-(β-diethylaminoethoxy)-aniline, 2- or 4-(β-dimethylaminoethoxy)-aniline, 2-, 3- or 4-amino-N,N-dimethylaniline, 1-amino-2-(2-dimethylaminoethoxy)-ethane, 2-dimethylaminoethanol, 2-diethylaminoethanol, 2-(2-dimethylaminoethoxy)-ethanol, 3-dimethylamino-1-propanol, 1-dimethylamino-2-propanol, 1-diethylamino-2-propanol, 1,3-bis-(dimethylamino)-2-propanol and 3- or 4-dimethylaminomethylphenol.

Examples of suitable quaternising agents are: dimethyl sulphate, diethyl sulphate, methyl toluenesulphate, ethyl toluenesulphate, methyl chloride, methyl bromide and the like.

(2) Reaction of dyestuffs of the formula

(XXV)

with halogenotriazines of the formula

halogen-W       (XXVI)

which are in turn obtained from trihalogenotriazines and 1 mol of XXII, XXIII or XXIV.

(3) Reaction of dyestuffs of the formula

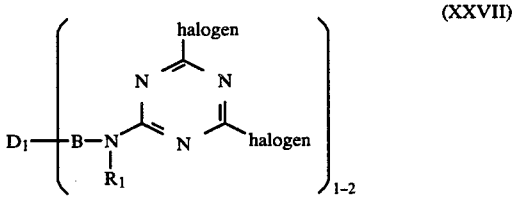

(XXVII)

with 1 mol per cyanuric halide radical of a compound

H–U       (XXVIII)

(4) Reaction of dyestuffs of the formula

(XXIX)

with

halogen-$W_1$       (XXX)

XXX in turn being obtained from 1 mol of trihalogenotriazine and 1 mol of a compound

H-U TM (XXVIII)

Examples of suitable dyestuffs XXV and XXIX are: 1-amino-anthraquinone, 1,4-diamino-anthraquinone, 1,5-diamino-anthraquinone, 1,8-diamino-anthraquinone, 1-amino-4-benzoylamino-anthraquinone, 1-amino-5-benzoylamino-anthraquinone, 1-amino-5-acetylamino-anthraquinone, 1-amino-8-benzoylamino-anthraquinone, 1-amino-4-methylamino-anthraquinone, 1-amino-4-ethylamino-anthraquinone, 1-amino-4-isopropylamino-anthraquinone, 1-amino-4-cyclohexylamino-anthraquinone, 1-amino-4-(4'-methylphenylamino)-anthraquinone, 1-amino-4-(4'-methoxyphenylamino)-anthraquinone, 1-amino-4-acetylamino-anthraquinone, 1-amino-4-phenylamino-anthraquinone, 1-amino-4-(3'-aminophenylamino)-anthraquinone, 1-amino-4-(4'-aminophenylamino)-anthraquinone, 1-(3'-aminophenylamino)anthraquinone, 1-(4'-aminophenylamino)-anthraquinone, 1-methylamino-4-(3'-aminophenylamino)-anthraquinone, 1-methylamino-4-(4'-aminophenylamino)-anthraquinone, 1-ethylamino-4-(3'-aminophenylamino)-anthraquinone, 1-isopropylamino-4-(3'-aminophenylamino)-anthraquinone, 1-isopropylamino-4-(4'-aminophenylamino)-anthraquinone, 1-sec.-butylamino-4-(3'-aminophenylamino)-anthraquinone, 1-n-butylamino-4-(4'-aminophenylamino)-anthraquinone, 1-isobutylamino-4-(3'-aminophenylamino)-anthraquinone, 1-isopropylamino-4-(4'-methylamino-anilino)-anthraquinone, 1-methylamino-4-(3'-aminomethyl-4'-methylphenylamino)-anthraquinone, 1-isopropylamino-4-(3'-methylaminomethyl-4'-methoxy-phenylamino)-anthraquinone, 1-ethylamino-4-(4'-methylaminomethylphenylamino)-anthraquinone, 1-cyclohexylamino-4-(3'-aminophenylamino)-anthraquinone, 1-amino-4-hydroxy-anthraquinone, 1-amino-4-methoxy-anthraquinone, 1-amino-4-(β-methoxyethoxy)-anthraquinone, 1,4-diamino-2-phenoxy-anthraquinone, 1,4-diamino-2-methoxy-anthraquinone, 1,4-diamino-2-(β-methoxyethoxy)-anthraquinone, 1,4-diamino-2-bromo-anthraquinone, 1,4-diamino-2-chloro-anthraquinone, 1,4-diamino-2-methyl-anthraquinone, 1,4-diamino-2-nitroanthraquinone, 1,4-diamino-2-cyano-anthraquinone, 1,4-diamino-2-acetyl-anthraquinone, 1,4-diamino-2-formyl-anthraquinone, 1,4-diamino-2-sulphophenoxyanthraquinone, 1,4-diamino-2-methylsulphonyl-anthraquinone, 1,4-diamino-anthraquinone-2-carboxylic acid methyl ester, 5-amino-thiazolanthrone, 1,4-diamino-2-(4'-aminophenoxy)-anthraquinone, 1,4-diamino-2-(3'-aminophenoxy)-anthraquinone, 1,4-diamino-2-sulpho-(3'-aminophenoxy)-anthraquinone, 1,4-diamino-5-nitro-anthraquinone, 1-amino-4-hydroxy-2-(4'-aminophenoxy)-anthraquinone, 1-amino-4-hydroxy-2-(3'-aminophenoxy)-anthraquinone, 1-amino-4-hydroxy-2-[β-(4'-aminophenoxy)-ethoxy]-anthraquinone, 1-amino-4-hydroxy-2-[β-(phenylamino)-ethoxy]-anthraquinone, 1-amino-4-hydroxy-2-(4'-aminomethyl-phenoxy)-anthraquinone, 1-(4'-amino-phenylamino)-4-hydroxy-anthraquinone, 1-(3'-amino-phenylamino)-4-hydroxy-anthraquinone, 3,4-phthalo-2-amino-acridone, 1,5-diamino-4,8-dihydroxy-anthraquinone, 1,8-diamino-4,5-dihydroxy-anthraquinone, 1-amino-4,8-dihydroxy-5-(4'-methylphenylamino)-anthraquinone, 1-amino-4,5-dihydroxy-8-(4'-methylphenylamino)-anthraquinone, 1-amino-4,8-dihydroxy-5-phenylamino-anthraquinone, 1-amino-4,5-dihydroxy-8-(4'-methoxyphenylamino)-anthraquinone, 1-amino-4,8-dihydroxy-5-isopropylamino-anthraquinone, 1-amino-4,5-dihydroxy-8-isopropylamino-anthraquinone, 1-amino-4,8-dihydroxy-5-methylamino-anthraquinone, 1-amino-4,5-dihydroxy-8-methylamino-anthraquinone, 1-amino-5-methylamino-anthraquinone, 1-amino-5-isopropylamino-anthraquinone, 5-amino-1,4-bis-(4'-methylphenylamino)-anthraquinone, 5-amino-1,4-bis-isopropylamino-anthraquinone, 1-amino-4-chloro-5,8-bis-isopropylamino-anthraquinone, 1-amino-4-chloro-5,8-bis-(4'-methylphenylamino)-anthraquinone, 1-amino-5-methoxy-anthraquinone, 1-amino-8-methoxy-anthraquinone, 1-amino-5-(β-methoxyethoxy)-anthraquinone, 1-amino-5-nitro-anthraquinone, 1-amino-8-nitro-anthraquinone, an isomer mixture of 1-amino-6- and -7-nitro-anthraquinone, 1,4-diamino-anthraquinone-2,3-dicarboxylic acid 3'-aminophenylimide, 1-(β-aminoethylamino)-4-(4'-methylphenylamino)-anthraquinone, 1-amino-4-(3'-aminophenylamino)-2-methoxy-anthraquinone, 1-amino-4-(4'-aminophenylamino)-2-phenoxy-anthraquinone, 1-amino-4-(4'-methylaminomethyl-phenylamino)-2-phenoxy-anthraquinone, 1-amino-2-methoxy-4-(4'-methylaminomethyl-phenylamino)-anthraquinone, 5-amino-1,4-bis-phenylmercapto-anthraquinone, 1-amino-4-(3-dimethylamino-1-propylamino)-anthraquinone, 5-amino-1,4-bis-(3-dimethylamino-1-propylamino)-anthraquinone, 1-amino-4-(4'-dimethylaminomethylphenylamino)-anthraquinone, 1-amino-4-(3'-dimethylaminomethyl)-phenylamino)-anthraquinone, 1-amino-4-(4'-diethylamino-methyl-phenylamino)-anthraquinone, 1-amino-4-(4'-β-diethylaminoethoxyphenylamino)-anthraquinone, 1-amino-4-(2'-β-dimethylamino-ethoxy-phenylamino)-anthraquinone, 5-amino-1,4-bis-(4'-β-diethylaminoethoxy-phenylamino)-anthraquinone, 5-amino-1,4-bis-(4'-dimethylaminomethyl-phenylamino)-anthraquinone, 5-amino-1,4-bis-(3'-dimethylaminomethylphenylamino)-anthraquinone, 1-amino-4-(2'-dimethylaminomethyl-phenylamino)-anthraquinone, 4'-amino-3-nitro-diphenylamine-1-sulphonic acid N,N-dimethylamide, 4'-amino-3-nitro-diphenylamine-1-sulphonic acid N-methylamide, 4'-amino-3-nitrodiphenylamine-1-sulphonic acid N-ethylamide, 3'-amino-3-nitrodiphenylamine-1-sulphonic acid N-hydroxyethylamide, 4'-amino-3-nitrodiphenylamine-1-sulphonic acid N-phenylamide, 4'-amino-3-nitrodiphenylamine-1-sulphonic acid N-methylanilide, 4'-amino-3-nitro-1-methylsulphonyldiphenylamine, 4'-amino-3-nitro-1-ethylsulphonyldiphenylamine, 3-nitrodiphenylamine-1-sulphonic acid N-(4''-amino-phenylamide), 4'-methyl-3-nitrodiphenylamino-1-sulphonic acid N-(3''-aminophenylamide), 4'-methoxy-3-nitrodiphenylamine-1-sulphonic acid N-(β-aminoethylamide), 3-nitro-diphenylamine-1-sulphonic acid N-(β-aminoethylamide), 3-nitro-4'-methoxy-diphenylamine-1-sulphonic acid N-(4''-aminophenylamide), 3-nitro-4'-methoxy-diphenylamine-1-sulphonic acid N-(3''-aminophenylamide), 3-nitro-2'-methoxy-diphenylamine-1-sulphonic acid N-(4''-aminophenylamide), 3-nitro-4'-acetylamino-diphenylamine-1-sulphonic acid (4''-aminophenylamide) and 3-nitro-4'-acetylaminodiphenylamine-1-sulphonic acid N-(β-aminoethylamide).

Examples of suitable compounds XXVIII are: ammonia, methylamine, dimethylamine, ethylamine, diethylamine, propylamine, isopropylamine, dipropylamine, butylamine, dibutylamine, methylethylamine, aminoethanol, diethanolamine, methylaminoethanol, morpholine, pyrrolidine, piperidine, cyclohexylamine, methylcyclohexylamine, benzylamine, benzylmethylamine, β-phenylethylamine, aniline and substituted anilines, such as 2-, 3- or 4-methylaniline, 2-, 3- or 4-chloroaniline, 2-, 3- or 4-methoxyaniline, 3- or 4-nitroaniline, 3- or 4-acetylaminoaniline, N-methyl-N-acetylaminoaniline, 2- or 4-β-hydroxyethoxyaniline, 2- or 4-methylsulphonylaniline, 4-trifluoromethylaniline, 3-(4-aminobenzenesulphonic acid dimethylamide, 3- or 4-aminobenzenesulphonic acid methylamide, 2-, 3- or 4-aminobenzenesulphonic acid methyl ester or ethyl ester, N-methylaniline and N-hydroxyethylaniline, phenol, 2-, 3- or 4-methylphenol, 2-, 3-, or 4-chlorophenol, 2-, 3- or 4-ethylphenol, 2,3-dimethylphenol, 3,4-, 2,4-, 3,5- or 2,5-dimethylphenol, 2,3,5-trimethylphenol, 2-tert.-butylphenol, 4-tert.-butylphenol, 4-(1,1-dimethylpropyl)-phenol, 4-(1,1,3,3-tetramethylbutyl)-phenol, nonylphenol, dodecylphenol, 2-, 3- or 4-isopropylphenol, 2,4- or 2,5-dichlorophenol, 2,4,5-trichlorophenol, 3- or 4-nitrophenol, 3-chloro-4-nitrophenol, 4-chloro-2-methylphenol, 5-chloro-2-methylphenol, 6-chloro-3-methyl-phenol, 4-methyl-2-nitrophenol, 2-, 3- or 4-hydroxybenzoic acid methyl ester or ethyl ester, 2-cyclohexylphenol, 4-cyclohexylphenol, 2-cyclohexyl-4-methylphenol, 2-, 3- or 4-methoxyphenol, 2-(1-methylethoxy)-phenol, 2-ethoxyphenol, 2- or 4-phenoxyphenol, 2-, 3- or 4-methylmercaptophenol, 3,5-dimethyl-4-(methylmercapto)-phenol, 2-, 3- or 4-hydroxybiphenyl, 2- or 4-benzylphenol, 5,6,7,8-tetrahydro-1-naphthol, 1-naphthol, 2-naphthol, 1-hydroxy-anthraquinone, 2-hydroxyanthraquinone, 2- or 4-hydroxypyridine, 2- or 4-hydroxyquinoline, 3-hydroxy-2-methylquinoline, methanol, ethanol, propanol, isopropanol, butanol, isobutanol, sec.-butanol, tert.-butanol, 2-methoxyethanol, 2-ethoxyethanol, 2-chloroethanol, methylmercaptan, ethylmercaptan, mercaptoethanol and fluorophenol.

The condensation reactions can be carried out in organic solvents, such as acetone, acetonitrile, benzene, toluene, xylenes, nitrobenzene, chlorinated hydrocarbons, dimethylformamide, formamide, N-methylpyrrolidone, tetramethylene sulphone, dioxane, tetrahydrofurane and the like, in the presence of acid-binding organic bases, such as, for example, N,N-dimethylaniline, N,N-diethylaniline, trimethylamine, triethylamine, N,N-dimethylcyclohexylamine, diazabicyclooctane and the like.

(5) Replacement of chlorine by fluorine in the triazine radical of corresponding chlorotriazinyl dyestuffs using alkali metal fluorides in organic solvents, such as tetramethylene sulphone, N-methylpyrrolidone and dimethylformamide.

(6) Coupling of diazotised amines with coupling components, the diazo component and/or the coupling component containing a halogenotriazinyl radical and a basic group.

The new reactive dyestuffs, in the form of their salts or quaternary compounds, are soluble in water and can be used, either individually or as mixtures, for dyeing and printing. They are suitable for use in continuous dyeing and printing of synthetic fibre materials, such as cellulose esters, polyamide and, above all, polyester fibres, and for continuous dyeing and printing of cellulose fibres which can be swollen in water, and they are applied by the customary processes.

The process is particularly interesting for continuous dyeing and printing of fibre blends of cellulose and synthetic fibres, in particular cotton/polyester fibre blends, since it enables matching shade dyeing or printing to be carried out by a one-stage procedure. Customary non-reactive disperse dyestuffs can optionally also be used. In this case, the process is preferably carried out in an acetic acid medium. Known auxiliaries (dyestuff solvents or swelling agents), such as are described, for example, in German Auslegeschrift No. 1,811,796 and German Offenlegungsschriften Nos. 2,525,243, 2,528,743 and 2,751,830 (preferably polyglycols), do not have to be used with the new type of dyestuffs; however, the distribution of the dyestuff on the polyester/cotton mixed fabric can be controlled by the addition of relatively small amounts (5–30 g/kg) of these auxiliaries.

Particularly good results are obtained if organic fixing auxiliaries (acid-trapping agents) are also used. Suitable fixing auxiliaries, which are preferably used in amounts of 1–5 g/kg of padding liquor or printing paste, are monoepoxides and polyepoxides, in particular the reaction products of aliphatic alcohols or polyols with epichlorohydrin. Examples which may be mentioned are reaction products of alkylglycols, monoalkyl ethers of polyglycols or polyglycols, such as

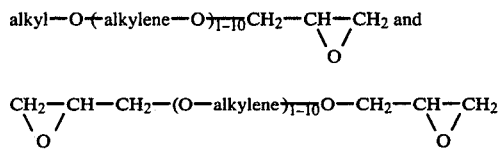

in which
alkyl denotes $C_1$–$C_4$-alkyl and
alkylene denotes $C_2$–$C_4$-alkylene,
such as are described, for example, in German Patent Application P No. 28 38 274.

It is preferable not to add an alkali in the dyeing and printing processes but to carry out the processes in a weakly acid medium.

On fibre blends, the new reactive dyestuffs produce dyeings and prints in colour shades which match well. The dyeings and prints are distinguished by very good fastness properties, of which, in addition to fastness to sublimation, light and dry cleaning, fastness to wet processing should be singled out in particular.

Whilst in the abovementioned swelling process using selected disperse dyestuffs the dyestuffs can be completely extracted from the cellulose dyeings with, for example, N-methylpyrrolidone, the dyeings obtained using the new reactive dyestuffs are stable towards the extraction agent since they have undergone covalent bonding to the cellulose fibre.

If they are not already in a water-soluble form, the new reactive dyestuffs are converted into such a form, preferably with organic acids, such as dilute acetic acid, before the dyeing or printing process. The padding liquor or printing paste can contain, in addition to water, the customary constituents such as dispersing agents, thickeners and/or swelling agents and/or dyestuff solubilising agents.

Dyeing is carried out by a procedure in which the textile materials containing cellulose fibres are impregnated with the aqueous padding liquors in the customary manner, are squeezed off to a weight increase of 40–100% and, if appropriate after intermediate drying for a short period, are subjected to heat treatment at 190°–230° C. for 30–90 seconds.

For printing, the printing pastes are prepared using the thickeners customary for reactive dyestuffs, such as alginates. The dyestuffs are fixed on the printed textile materials either by a dry heat treatment at 180°–230° C. for one to two minutes or by a steam treatment at 170°–210° C. for two to fifteen minutes.

The dyestuffs are also suitable for dyeing pulp or paper from an acetic acid solution. Customary processes are used for dyeing paper, that is to say either the pulp is first dyed, after adding sizing agents and aluminium sulphate, and sheets of paper are then produced, or finished sheets of paper are dyed on the surface, after the addition of starch, by immersion in the dyeing solution.

EXAMPLE 1

11.0 g of 4'-amino-3-hydroxyquinophthalone are suspended in 60 ml of nitrobenzene. 5.4 g of N,N-dimethylaniline are added to the suspension, and 6.0 g of 2,4,6-trifluorotriazine are added dropwise at 20° C. in the course of 10 minutes. After subsequently stirring the mixture for two hours, the condensation reaction has ended. 60 ml of toluene are allowed to run into the suspension and the precipitate is filtered off and washed with toluene. The resulting filter cake is suspended in 80 ml of toluene. 6.2 g of 1-amino-3-dimethylaminopropane are added dropwise to the resulting suspension at 20° C. in the course of 30 minutes and the mixture is subsequently stirred for 2 hours. The dyestuff suspension is filtered and the filter cake is washed with toluene and dried in a circulating air cabinet at 60°.

A dyestuff of the formula

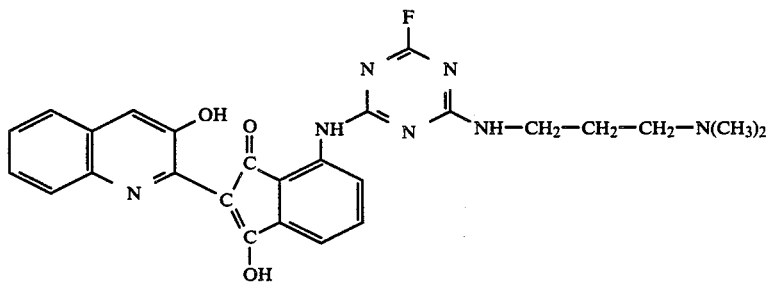

which is readily soluble in dilute acetic acid is obtained. From this solution, the dyestuff produces matching shade yellow dyeings with very good fastness to wet processing and rubbing and excellent fastness to light or polyester/cotton fibre blends by the processes of Examples 2 and 3.

A very similar dyestuff is obtained if, instead of 4'-amino-3-hydroxyquinophthalone an equivalent amount of a mixture of 3'- and 4'-amino-3-hydroxyquinophthalone is used.

EXAMPLE 2

10.5 g of the dyestuff obtained according to Example 1 are suspended in water and are dissolved by pouring 30 ml of 30% strength acetic acid over the suspension. The solution formed is made up to 1,000 ml. A polyester/cotton mixed fabric with a polyester/cotton ratio of 65/35 is impregnated with the aid of a padder, the liquor pick-up of the fabric being about 65%. The fabric treated in this manner is dried and the dyestuff is fixed on the two fibres by a hot air treatment in a thermosol unit at 215° for 60 seconds. After customary after-treatment by soaping close to the boiling point and after drying, a completely neutral yellow shade which matches well on the two fibre materials is obtained. The finished dyeing exhibits good fastness to daylight, good fastness to rubbing when dry or wet and outstanding fastness to wet processing.

Instead of the hot air treatment described, the padded polyester/cotton mixed fabric can also be subjected to a steaming process at 175° C. for 8 minutes.

EXAMPLE 3

10.5 g of the dyestuff obtained according to Example 1 are suspended in water and are dissolved with 30 ml of 30% strength dilute acetic acid. 4.0 g of an epoxide compound of the formula

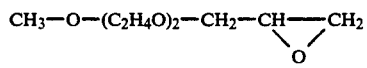

26.0 g of a polyethylene glycol ether of molecular weight 400 and 10.0 g of a 10% strength aqueous solution of a customary thickener are added and the entire mixture is made up to 1,000 ml with water.

A polyester/cotton mixed fabric is dyed, as described in Example 2, using the padding liquor prepared in this manner.

In a modification of the procedure described, instead of using dilute acetic acid, the dyestuff can also be dissolved by being suspended in water and adjusting the pH value to 3.5–4 by carefully adding 10% strength hydrochloric acid.

EXAMPLE 4

11.2 g of 1-amino-anthraquinone are suspended or dissolved in 100 ml of nitrobenzene and 12.5 ml of dimethylformamide. 7.3 g of 2,4,6-trifluorotriazine are added dropwise in the course of 30 minutes, the mixture is subsequently stirred for 30 minutes and the temperature is then increased to 50°. The mixture is subsequently stirred at this temperature for 30 minutes, cooled to 20° and diluted with 125 ml of methanol, and the difluorotriazinylaminoanthraquinone is filtered off, and dried at 50° in a circulating air drying cabinet.

15.8 g of the resulting intermediate product are suspended in 90 ml of toluene. 9.5 g of 1-amino-3-dimethylaminopropane are added dropwise in the course of 30 minutes and the mixture is subsequently stirred for a further hour. The dyestuff which has precipitated is filtered off, washed with toluene and ligroin and dried at 50° in a circulating air cabinet. It has the formula

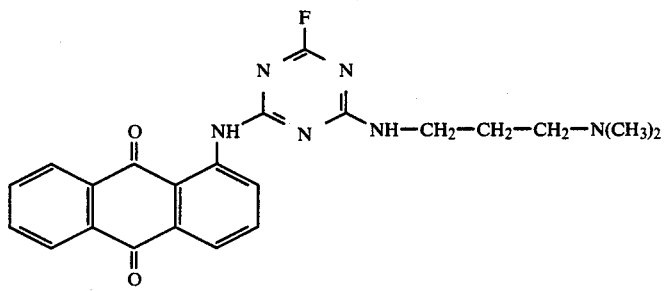

and dyes polyester/cotton mixtures, from a weakly acid solution by the process of Examples 2 and 3, in uniform yellow shades which are fast to light, rubbing and wet processing.

EXAMPLE 5

10.3 g of 1-amino-4,8-dihydroxy-5-isopropylamino-anthraquinone are introduced into 80 ml of nitrobenzene and 20 ml of dimethylformamide. 4.8 g of 2,4,6-trifluorotriazine are added dropwise in the course of 5 minutes, during which the temperature is allowed to rise to 30°. The mixture is then kept at 30°–35° for 15 minutes, the temperature is subsequently further increased to 50° and the mixture is then stirred at this temperature for 15 minutes. It is cooled to 20° and diluted with 100 ml of methanol. The intermediate product which has precipitated is filtered off, washed with methanol and dried at 50° in a circulating air cabinet.

8.5 g of the resulting product are stirred in 85 ml of toluene. 4.1 g of 1-amino-3-dimethylaminopropane are added dropwise to the suspension in the course of 15 minutes, during which the temperature is allowed to rise to 35°. After 30 minutes at 65°, the reaction has ended. The resulting dyestuff of the formula

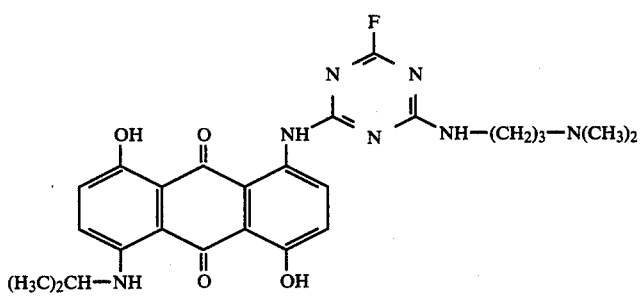

is filtered off, washed with toluene and petroleum ether and dried at 60° in a circulating air cabinet.

On polyester/cotton mixtures, the dyestuff produces, by the process of Example 3, uniform blue dyeings which are fast to light, wet processing and rubbing.

EXAMPLE 6

15 g of 1-amino-2-(4'-aminophenoxy)-4-hydroxyanthraquinone are suspended in 45 ml of nitrobenzene and 6.3 g of N,N-dimethylaniline. 7.1 g of 2,4,6-trifluorotriazine are added dropwise at 20° in the course of 10 minutes and, after subsequently stirring the mixture for one hour, after which the condensation reaction has ended, the dyestuff which has precipitated is filtered off, washed with methanol and dried at 50° in a circulating air cabinet.

16.5 g of the resulting difluorotriazinylamino dyestuff are suspended in 90 ml of toluene. 6.7 g of 1-amino-3-dimethylamino-propane are added dropwise in the course of 45 minutes, starting at 20°, the temperature gradually rising to 30°. After subsequently stirring the mixture for one hour, the condensation reaction has ended. The dyestuff of the formula

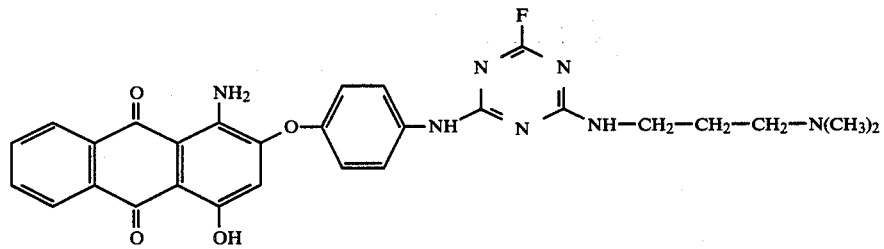

which is present in the form of a suspension, is filtered off, washed with toluene and dried at 60° in a circulating air cabinet. The dyestuff, which is soluble in dilute acetic acid, dyes polyester/cotton mixed fabric in solid red shades with very good fastness properties by the processes of Examples 2 and 3.

EXAMPLE 7

6.0 g of 2,4,6-trifluorotriazine are added dropwise to 16 g of 1-amino-4-hydroxy-2-(β-N-phenylaminoethoxy)-anthraquinone in 65 ml of nitrobenzene and 5.4 g of N,N-dimethylaniline at 10° in the course of 15 minutes.

The temperature is then allowed to rise gradually to 20° and the mixture is subsequently stirred for about 2 hours in total. When the reaction has ended, the difluorotriazinyl intermediate product is further precipitated by adding 65 ml of isopropanol and is filtered off and the filter cake is washed with isopropanol and dried at 60° in a circulating air cabinet.

21.2 g of the resulting product are suspended in 100 ml of toluene. 8.8 g of 1-amino-3-dimethylaminopropane are added dropwise at 20°–25° in the course of 30 minutes and the condensation reaction is brought to completion in the course of one hour. The dyestuff precipitate is filtered off and the cake is washed with toluene and dried at 60° in a circulating air cabinet. The resulting dyestuff corresponds to the formula

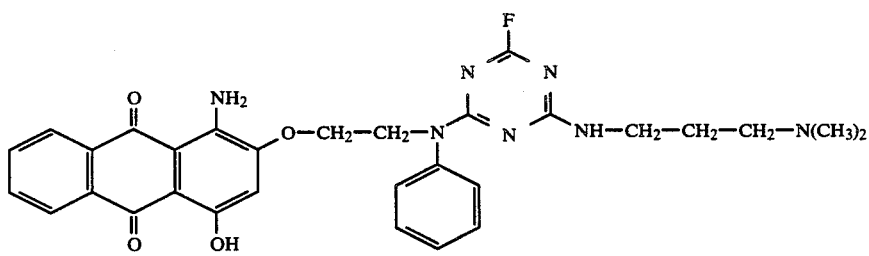

and dyes mixtures of polyester/cotton, from an acetic acid solution, according to Example 2, in uniform red shades with excellent fastness properties.

EXAMPLE 8

24 g of 5-amino-1,4-bis-phenylthio-anthraquinone are suspended in 80 ml of nitrobenzene and 8.3 g of N,N-dimethylaniline. 9.2 g of 2,4,6-trifluorotriazine are added dropwise at 20° in the course of 15 minutes and the mixture is subsequently stirred for 1 hour in order to bring the condensation reaction to completion. The precipitate is filtered off and the filter cake is washed with methanol and dried at 50° in a circulating air cabinet.

20.5 g of the resulting condensation product are suspended in 100 ml of toluene. 7.8 g of 1-amino-3-dimethylaminopropane are added dropwise at 20°–25° in the course of 1 hour and the mixture is then subsequently stirred for a further 2 hours. The dyestuff which has precipitated is now filtered off, washed with toluene and dried at 60° in a circulating air cabinet. It corresponds to the formula

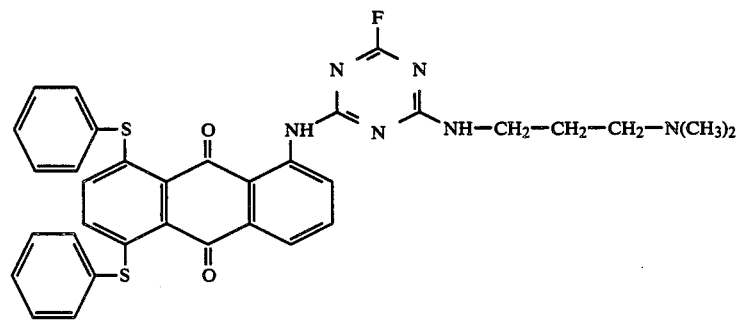

and uniformly dyes polyester/cotton fibre blends, from dilute acetic acid solutions by the process of Examples 2 and 3, in scarlet-red shades with very good fastness to wet processing.

EXAMPLE 9

12 g of 1-amino-4-hydroxy-anthraquinone are suspended in 60 ml of nitrobenzene and 25 ml of dimethylformamide. 7.5 g of 2,4,6-trifluorotriazine are then added dropwise in the course of 5 minutes, during which the temperature rises to 40°. The reaction mixture is warmed further to 50°–55° for 30 minutes, until the condensation reaction has ended. The mixture is allowed to cool and is diluted with 100 ml of methanol and the product is filtered off and washed with methanol. The difluorotriazinylamino-hydroxyanthraquinone obtained is dried in a circulating air cabinet at 60°.

8.5 g of the resulting intermediate product are stirred in 80 ml of toluene. 5.8 g of 1-amino-2-diethylaminoethane are added dropwise in the course of 15 minutes, during which the temperature is allowed to rise to 35°. After subsequently stirring the mixture for 30 minutes, the condensation reaction has ended. The dyestuff which has precipitated is filtered off at 20°, washed with toluene and petroleum ether and dried at 50° in a circulating air cabinet. The resulting dyestuff corresponds to the formula

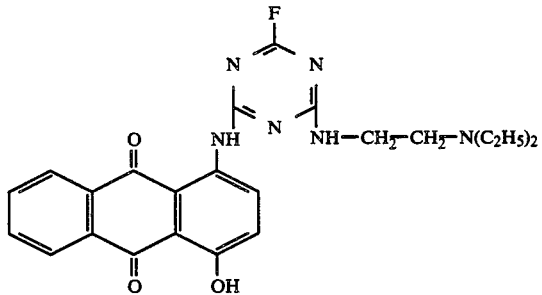

and, after being dissolved in dilute acetic acid, produces solid scarlet-red dyeings, with good fastness to light, rubbing and wet processing, on polyester/cotton mixtures by the processes of Examples 2 and 3.

EXAMPLE 10

13.1 g of 1,4-diamino-anthraquinone-2-sulphonic acid phenyl ester are introduced into 90 ml of nitrobenzene and 20 ml of dimethylformamide. 4.8 g of 2,4,6-trifluorotriazine are added dropwise in the course of 5 minutes and the mixture is subsequently stirred at 30°–40° for 30 minutes and at 50°–55° for 30 minutes. It is diluted, at 20°, with 120 ml of methanol. The product which has precipitated is filtered off, washed with methanol and dried at 50° in a circulating air cabinet. 10.2 g of the resulting product are stirred in 80 ml of toluene. 4.1 g of 1-amino-3-dimethylaminopropane are added dropwise to the suspension in the course of half an hour. The mixture is subsequently stirred at 25°–30° for 30 minutes, until a sample examined by chromatography indicates that the condensation reaction has ended. The resulting precipitate is filtered off and the filter cake is washed with toluene and petroleum ether and dried at 50° in a circulating air cabinet. The resulting dyestuff corresponds to the formula

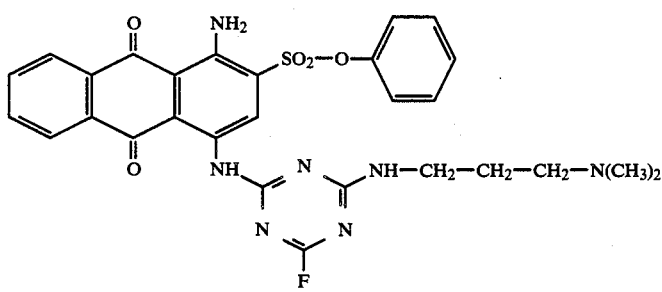

After being dissolved in a weakly acid medium, this dyestuff uniformly dyes polyester/cotton mixtures, by the processes of Examples 2 and 3, in violet shades which are fast to light, wet processing and rubbing.

EXAMPLE 11

11.0 g of 1,4-diamino-2-phenoxy-anthraquinone are introduced into 70 ml of nitrobenzene and 20 ml of dimethylformamide. 4.8 g of 2,4,6-trifluorotriazine are added dropwise in the course of 5 minutes and the mixture is then warmed to 30°–35° for 30 minutes and thereafter to 50°–55° for 30 minutes. When the condensation reaction has ended, the mixture is diluted with 120 ml of methanol. The intermediate product which has crystallised out is filtered off, washed with methanol and dried at 60° in a circulating air cabinet.

8.9 g of the resulting difluorotriazinylamino compound are suspended in 70 ml of toluene. 4.1 g of 1-amino-3-dimethyl-aminopropane are added dropwise in the course of 15 minutes, during which the temperature is allowed to rise to about 30°–35°. The mixture is subsequently stirred for a further 30 minutes and the dyestuff which has precipitated is then filtered off, washed with toluene and then with petroleum ether and dried in a circulating air cabinet. The dyestuff of the formula

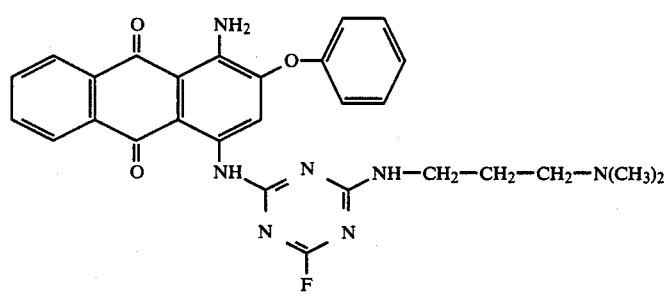

produces uniform dyeings, which are fast to light, wet processing and rubbing, in a violet colour shade on polyester/cotton mixtures from an acetic acid dyeing solution by the processes described in Examples 2 and 3.

EXAMPLE 12

10.2 g of the 1-(4,6-difluoro-2-triazinylamino)anthraquinone obtained according to Example 4 are stirred in 50 ml of toluene. 9.5 g of 4-amino-1-diethylaminopentane are added dropwise in the course of 30 minutes. The mixture is subsequently stirred for several hours in order to bring the condensation reaction to completion. Thereafter, it is poured slowly into 150 ml of petroleum ether, which has been cooled to 5°–10°, and the mixture is subsequently stirred at this temperature for some time, the precipitate is then filtered off and the filter cake is washed with petroleum ether. After drying at 50° in a circulating air cabinet, a product is obtained which corresponds to the formula

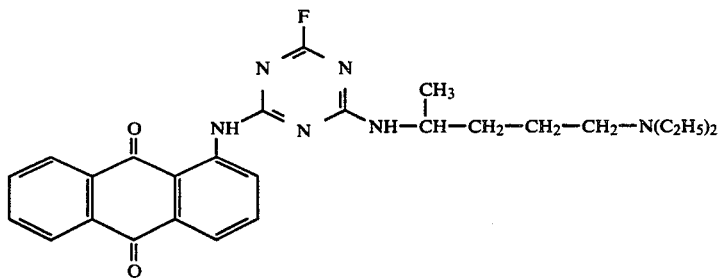

and dyes polyester/cotton mixtures, from a weakly acid solution by the processes of Examples 2 and 3, in solid yellow shades which are fast to light, wet processing and rubbing.

EXAMPLE 13

10.2 g of the 1-(4,6-difluoro-2-triazinylamino)-anthraquinone prepared according to Example 4 are stirred in 100 ml of toluene. 3.0 g of triethylamine and 4.5 g of 2-diethylaminoethanol are added and the mixture is heated to 60°–65° for 3 hours and thereafter to 80°–85° for a further hour. It is then cooled to 20°. 170 ml of petroleum ether are added to the reaction mixture and the dyestuff which has precipitated is filtered off, washed with petroleum ether and dried at 60° in a circulating air cabinet. The dyestuff of the formula produces solid dyeings, which are very fast to wet processing and rubbing, on polyester/cotton mixtures from an acetic acid solution by the processes of Examples 2 and 3.

EXAMPLE 14

If the 4.1 g of 1-amino-3-dimethylaminopropane in Example 5 are replaced by 5.2 g of 1-amino-3-(N-methyl-N-hydroxyethylamino)-propane and the procedure is otherwise as described in that example, a dyestuff of the formula

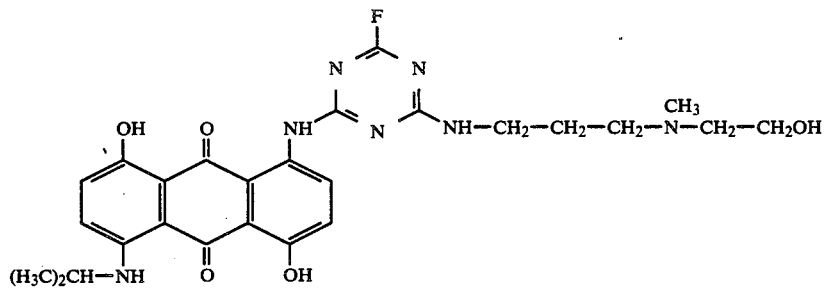

which has coloristic properties very similar to those of the dyestuff described in Example 5, is obtained.

EXAMPLE 15

18 g of the dyestuff of Example 6 are dissolved in 120 ml of nitrobenzene. After warming the solution to 60°, 4.5 g of dimethyl sulphate are added dropwise in the course of 10 minutes. After 30 minutes, a chromatogram of a sample shows that the reaction has ended. The resulting dyestuff suspension is cooled to 20° and the dyestuff is filtered off, covered twice with nitrobenzene and then washed with toluene.

After drying at 50° in a circulating air cabinet, a dyestuff of the formula

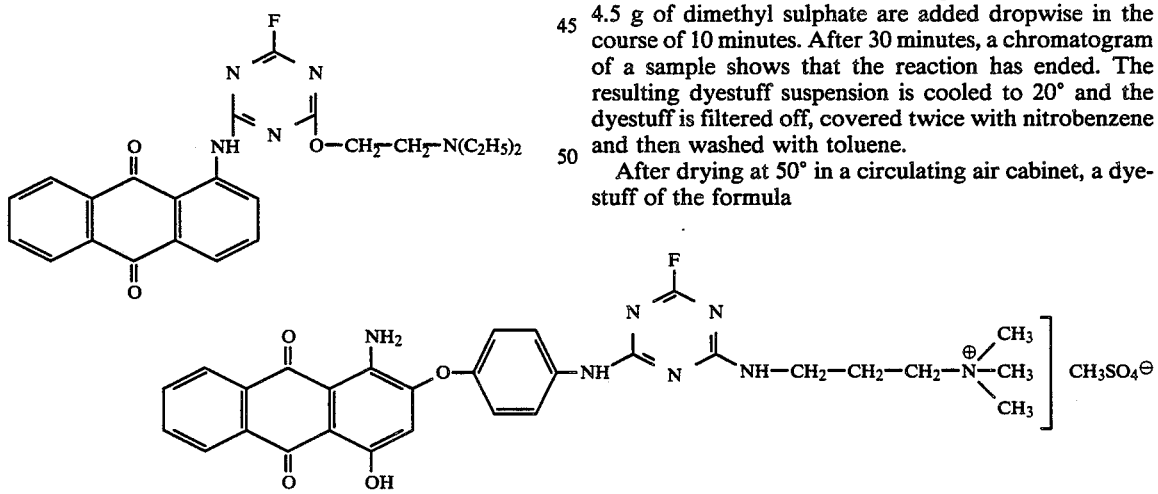

which uniformly dyes polyester/cotton mixtures in red shades with excellent fastness properties by the processes of Examples 2 and 3 is obtained.

EXAMPLE 16

11.2 g of the 1-(4,6-difluoro-2-triazinylamino)anthraquinone prepared according to Example 4 are suspended in 50 ml of nitrobenzene. 5.0 g of 2-aminobenzyl-N,N-dimethylamine are added to the suspension and stirring is continued for 1½ hours at 20°–30°, during which increasingly more solid dissolves. When the condensation reaction has ended, 120 ml of petroleum ether are added, the mixture is subsequently stirred for 1 hour in order to bring the precipitation to completion and the dyestuff which has precipitated is filtered off and washed with petroleum ether. After drying at 60° in a circulating air cabinet, a dyestuff is obtained which is readily soluble in dilute acetic acid, has the formula

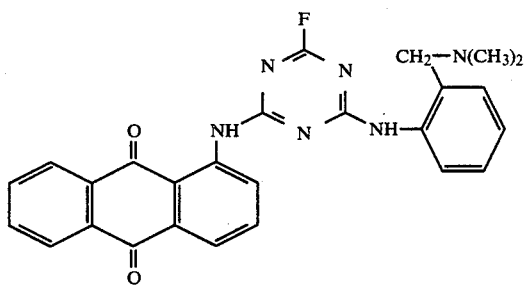

and uniformly dyes polyester/cotton mixtures in yellow shades, which are fast to light, wet processing and rubbing, by the processes of Examples 2 and 3.

A similar dyestuff is obtained if, instead of 2-aminobenzyl-N,N-dimethylamine, 5.0 g of 4-aminobenzyl-N,N-dimethylamine are employed.

EXAMPLE 17

8.0 g of 1-amino-4-hydroxy-2-(β-N-phenylaminoethoxy)-anthraquinone are suspended in 40 ml of nitrobenzene and 2.7 g of N,N-dimethylaniline. 3.0 g of 2,4,6-trifluorotriazine are added dropwise at 10° in the course of 15 minutes and the temperature is then allowed to rise gradually to 20°. The product which has precipitated is filtered off, washed with methanol and dried at 50° in a circulating air cabinet.

8.0 g of the resulting intermediate product are suspended or dissolved in 50 ml of dimethylformamide. A solution of 7.3 g of 4-(β-diethylaminoethoxy)-aniline in 15 ml of methanol is added dropwise in the course of 30 minutes. Fine needles are formed, and their precipitation is increased, when the reaction has ended, by adding a further 250 ml of methanol. The precipitate is filtered off, washed with methanol and dried at 50° in a circulating air cabinet. The resulting dyestuff corresponds to the formula

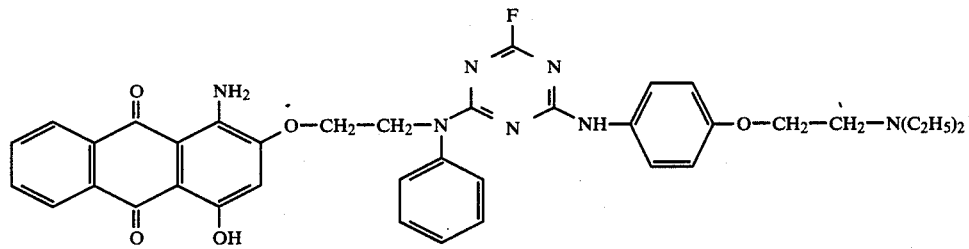

and uniformly dyes polyester/cotton mixtures in red shades with good fastness properties by the processes of Examples 2 and 3.

Further anthraquinone dyestuffs which are summarised in Table I and which give, after being dissolved in a weakly acid medium, solid fast dyeings of the shades indicated on polyester/cotton mixtures by the processes of Examples 2 and 3 can be prepared in an analogous manner.

TABLE I

| Example No. | Dyestuff | Colour shade |
|---|---|---|
| 18 | ![structure] | yellow |

TABLE I-continued
| Example No. | Dyestuff | Colour shade |
|---|---|---|
| 19 | 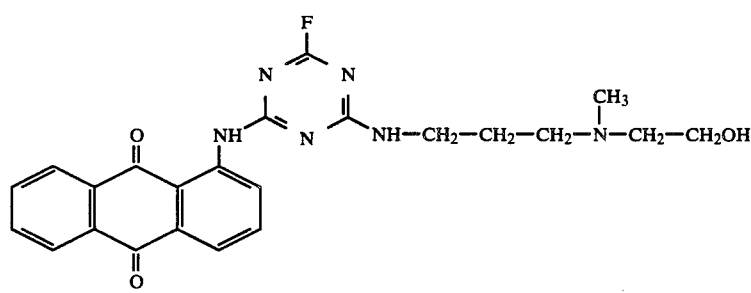 | yellow |
| 20 | 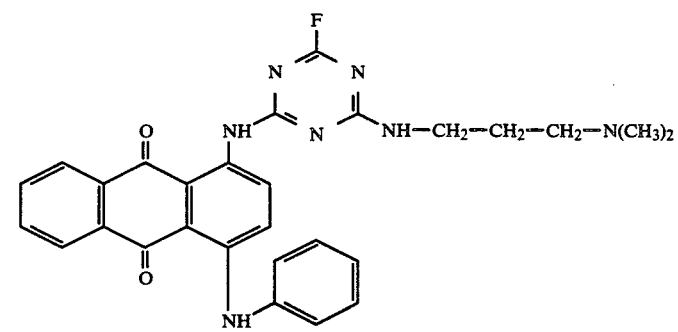 | blue |
| 21 | 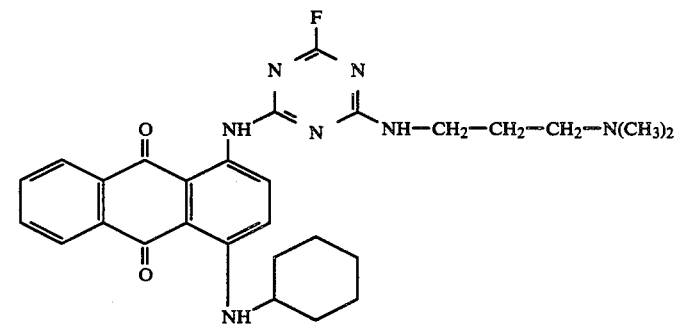 | violet |
| 22 | 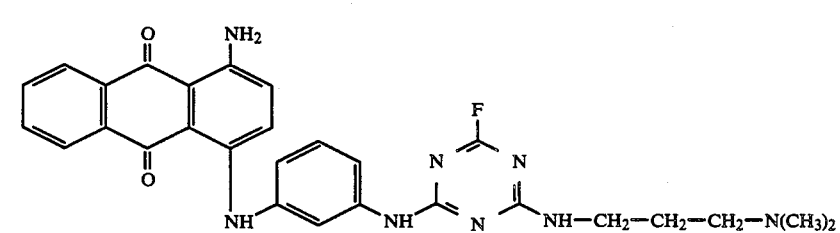 | blue |
| 23 | 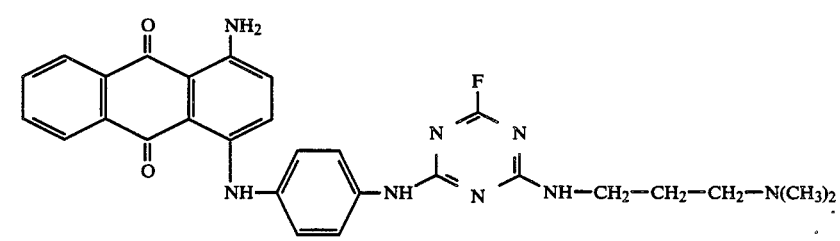 | blue |

TABLE I-continued

| Example No. | Dyestuff | Colour shade |
|---|---|---|
| 24 | 1-[(4-fluoro-6-{[2-(diethylamino)ethyl]thio}-1,3,5-triazin-2-yl)amino]-4-(isopropylamino)anthracene-9,10-dione | blue |
| 25 | 1-benzamido-5-[({[3-(dimethylamino)propyl]amino}(fluoro-1,3,5-triazin-2-yl)amino]anthracene-9,10-dione | orange |
| 26 | 1,5-bis[(fluoro-1,3,5-triazinyl){[3-(dimethylamino)propyl]amino}amino]-4,8-bis[(4-methoxyphenyl)amino]anthracene-9,10-dione | green |
| 27 | 1-[({[(1-methyl-3-(diethylamino)propyl]amino}(fluoro-1,3,5-triazin-2-yl))amino]-4,8-dihydroxy-5-(isopropylamino)anthracene-9,10-dione | blue |
| 28 | 1-benzamido-5-[({[3-(dimethylamino)propyl]amino}(fluoro-1,3,5-triazin-2-yl))amino]-4-hydroxyanthracene-9,10-dione | red |

TABLE I-continued
| Example No. | Dyestuff | Colour shade |
|---|---|---|
| 29 | 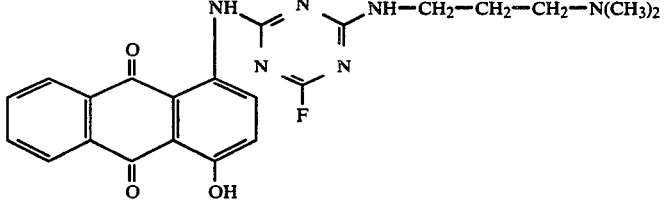 | scarlet |
| 30 | 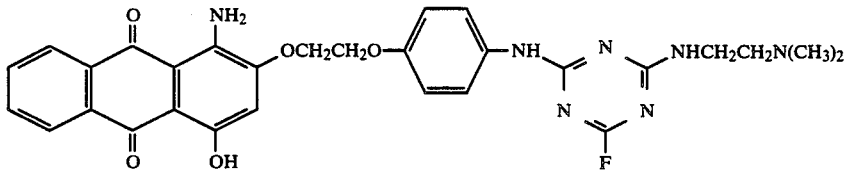 | red |
| 31 | 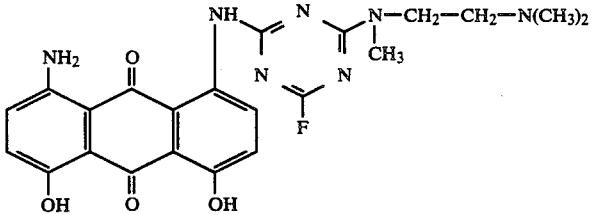 | blue |
| 32 | 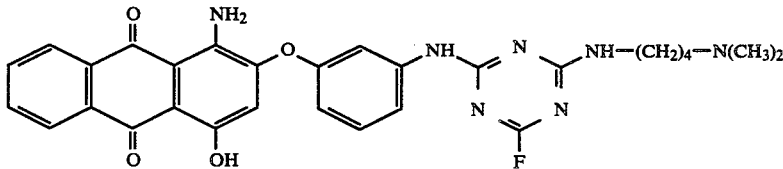 | red |
| 33 | 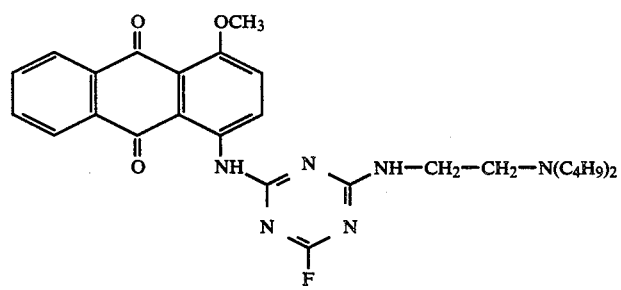 | orange |
| 34 | 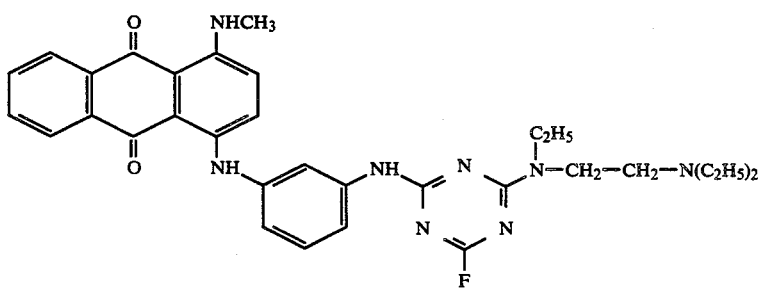 | blue |

TABLE I-continued

| Example No. | Dyestuff | Colour shade |
|---|---|---|
| 35 | anthraquinone with 4-NH₂, 3-NO₂, 1-NH-triazine(F)-NH-CH₂CH₂CH₂-N(CH₃)₂ | blue |
| 36 | anthraquinone with 4-NH₂, 3-CN, 1-NH-triazine(F)-NH-CH₂CH₂CH₂-N(C₃H₇)₂ | blue |
| 37 | anthraquinone with 4-OH, 1-NH-C₆H₄-NH-triazine(F)-NH-CH₂CH₂CH₂-N(CH₃)₂ | blue |
| 38 | anthraquinone with 4-NH₂, 3-CH₃, 1-NH-triazine(F)-NH-CH₂CH₂-N(CH₂CH₂OH)₂ | violet |
| 39 | anthraquinone with 4-NH₂, 3-COCH₃, 1-NH-triazine(F)-NH-CH₂CH₂CH₂-N(CH₃)₂ | blue |
| 40 | anthraquinone with 1-NH₂, 4-OH, 2-O-C₆H₄-CH₂-NH-triazine(F)-NH-CH₂CH₂-N(CH₃)(C₃H₇) | red |

TABLE I-continued
| Example No. | Dyestuff | Colour shade |
|---|---|---|
| 41 | 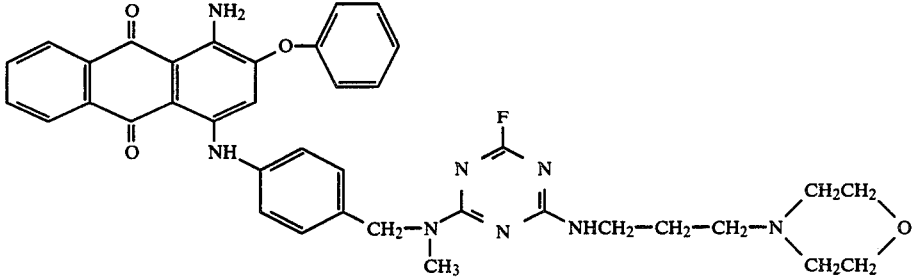 | blue-violet |
| 42 | 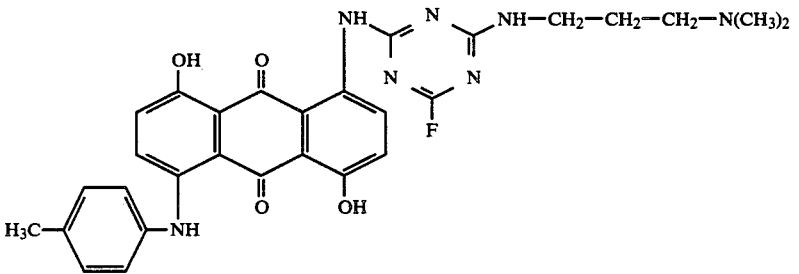 | blue |
| 43 | 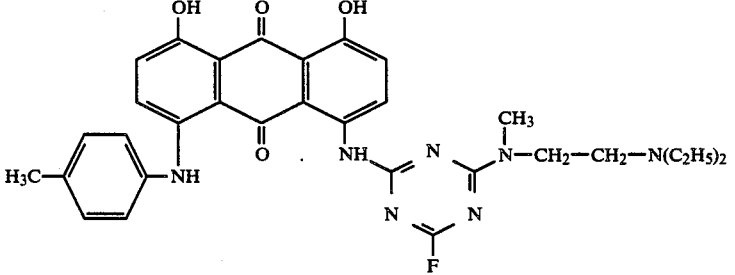 | blue |
| 44 | 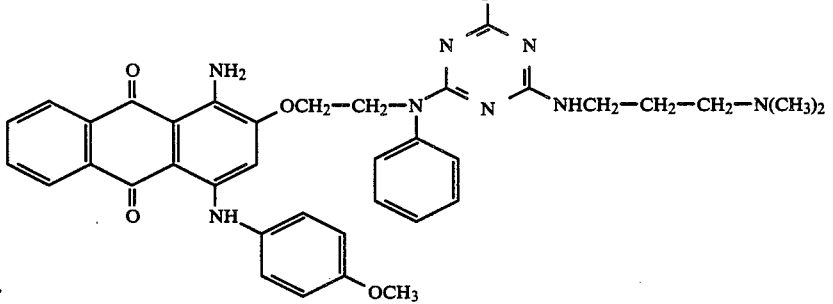 | blue |
| 45 | 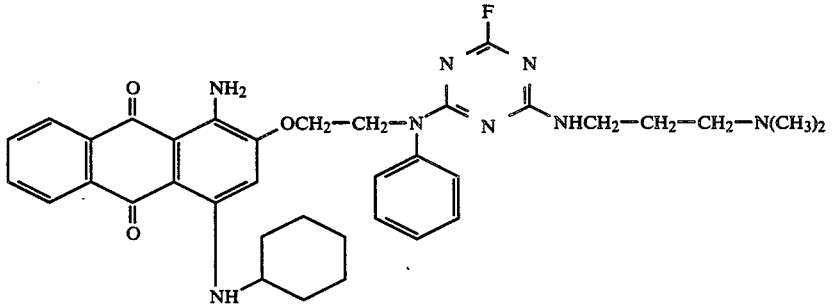 | violet |

TABLE I-continued
| Example No. | Dyestuff | Colour shade |
|---|---|---|
| 46 | 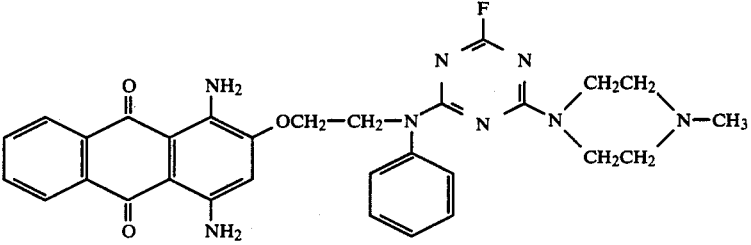 | violet |
| 47 | 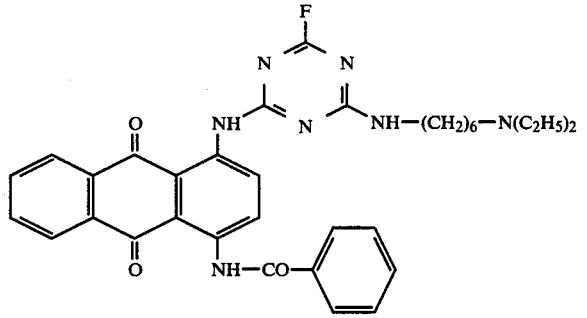 | scarlet |
| 48 | 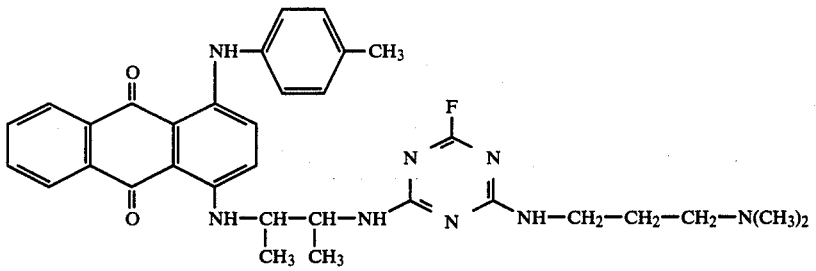 | blue |
| 49 | 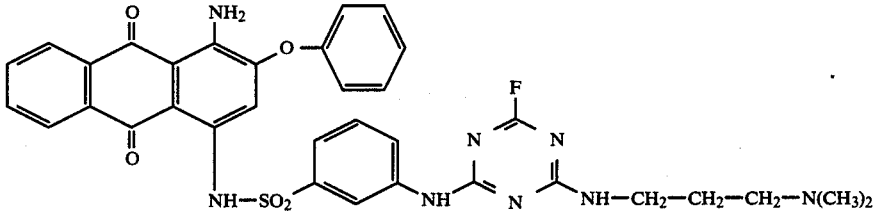 | red |
| 50 | 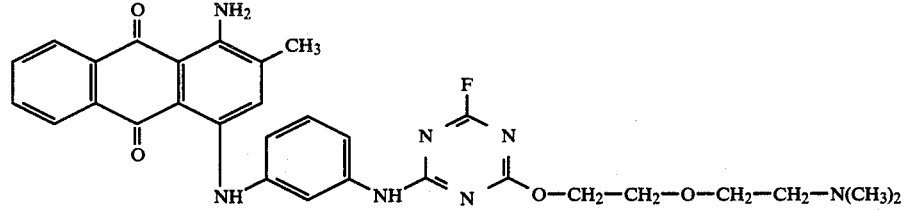 | blue |
| 51 | 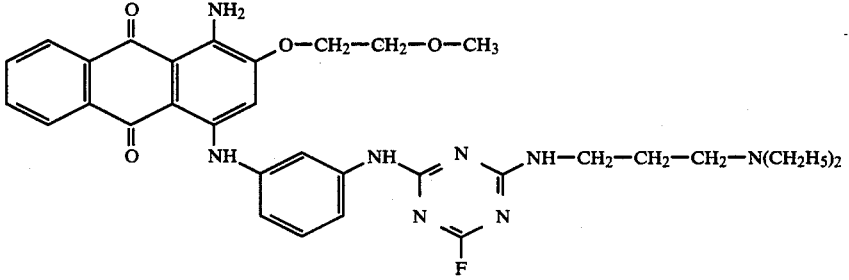 | violet |

TABLE I-continued
| Example No. | Dyestuff | Colour shade |
|---|---|---|
| 52 | 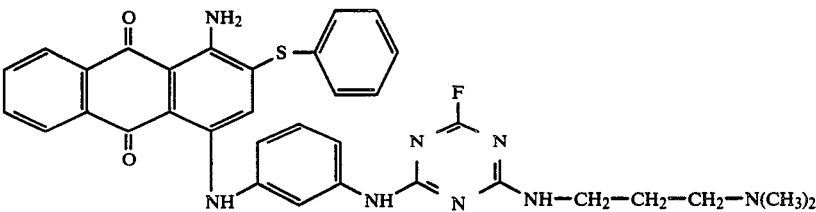 | blue |
| 53 | 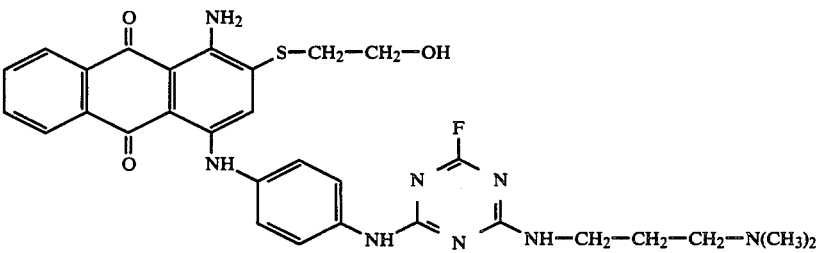 | blue-green |
| 54 | 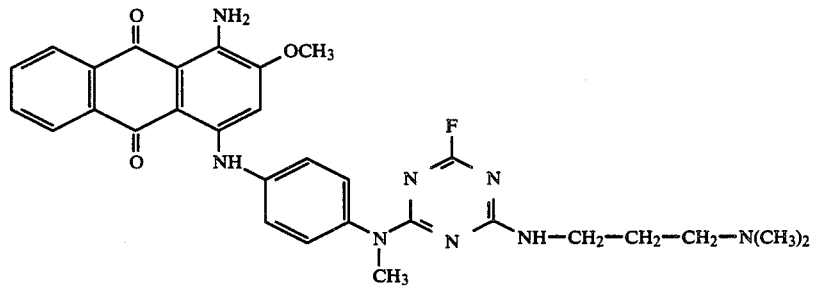 | blue |
| 55 | 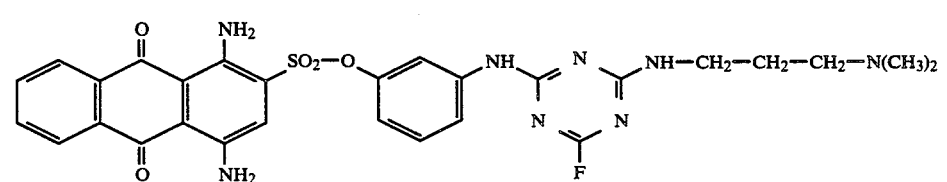 | blue |
| 56 | 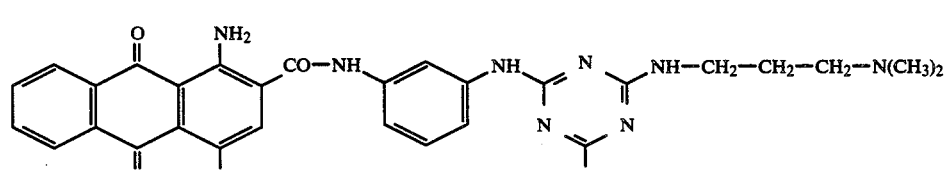 | blue |
| 57 | 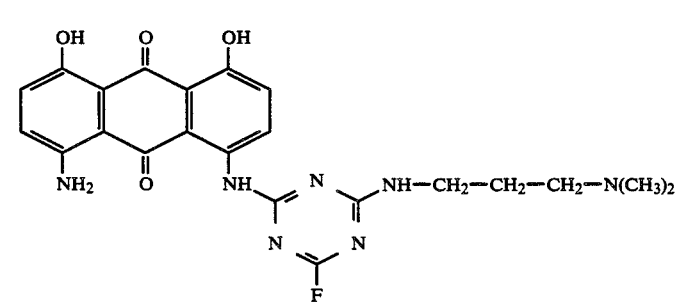 | blue |

TABLE I-continued

| Example No. | Dyestuff | Colour shade |
|---|---|---|
| 58 | Anthraquinone with 1,4-bis(4-methylphenylamino) substituents and 5-position linked to NH-C(=N-)-N(C₂H₅)-CH₂-CH₂-N(CH₃)₂ triazine with F | green |
| 59 | 3-hydroxyquinoline-2-yl linked to indandione system with NH-triazine(F)-NH-CH₂-CH₂-N(C₂H₅)₂ | yellow |
| 60 | 1-NH-[triazine(F)-NH-CH₂-CH₂-CH₂-N(C₂H₅)₂]-4-NH-CH(CH₃)₂ anthraquinone | blue |
| 61 | 1-NH-[triazine(F) with piperazine-N-CH₂-CH₂OH] anthraquinone | yellow |
| 62 | 1,4-diamino-2-[O-CH₂-CH₂-N(phenyl)-C(=N-triazine(F))-NH-CH₂-CH₂-CH₂-N(CH₃)₂] anthraquinone | red-violet |

TABLE I-continued

| Example No. | Dyestuff | Colour shade |
|---|---|---|
| 63 | (anthraquinone with 1-NH₂, 2-O-CH₂-CH₂-N(phenyl)-triazine(F)-NH-C₆H₄-CH₂-N(CH₃)₂, 4-OH) | red |
| 64 | (1,5-dihydroxy-4-(p-tolyl-NH)-8-[NH-triazine(F)-NH-C₆H₄-CH₂-N(CH₃)₂]-anthraquinone) | blue |
| 65 | (1-OH-4-[NH-C₆H₄-NH-triazine(F)-NH-C₆H₄-CH₂-N(CH₃)₂]-anthraquinone) | blue |
| 66 | (1-[NH-triazine(F)-NH-C₆H₄-O-CH₂-CH₂-N(C₂H₅)₂]-anthraquinone) | yellow |
| 67 | (anthraquinone with 1-NH₂, 2-O-C₆H₄-NH-triazine(F)-NH-C₆H₄-O-CH₂-CH₂-N(C₂H₅)₂, 4-OH) | red |
| 68 | (1,5-dihydroxy-4-[(CH₃)₂CH-NH]-8-[NH-triazine(F)-NH-C₆H₄-O-CH₂-CH₂-N(C₂H₅)₂]-anthraquinone) | blue |

TABLE I-continued

| Example No. | Dyestuff | Colour shade |
|---|---|---|
| 69 | 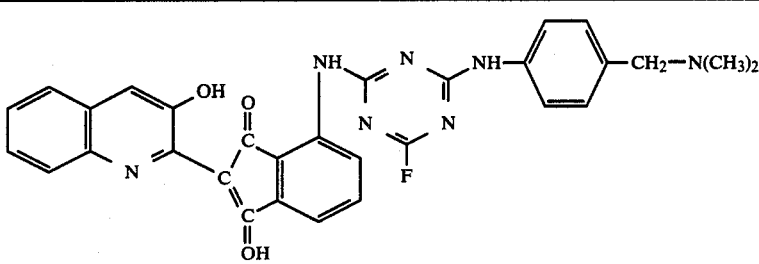 | yellow |
| 70 | 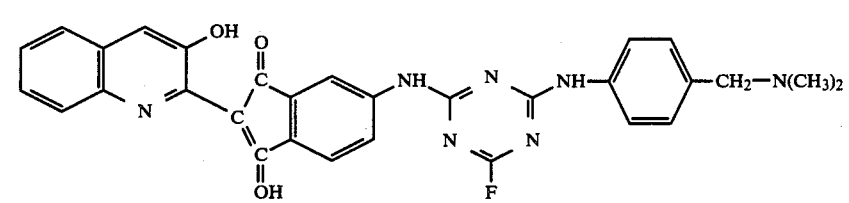 | yellow |
| 71 | 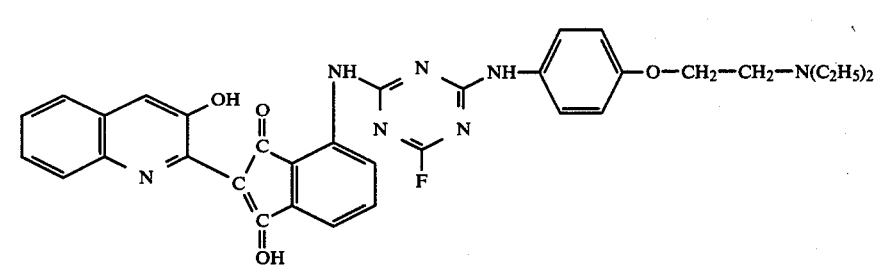 | yellow |
| 72 | 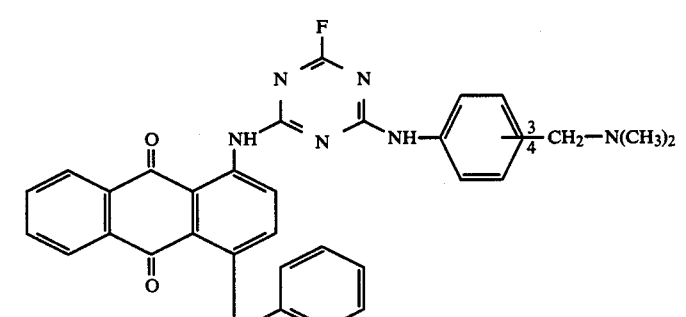 | blue |
| 73 | 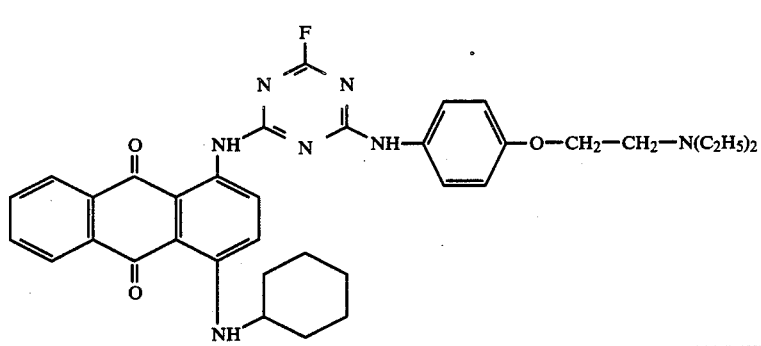 | blue |

EXAMPLE 74

16 g of 4-amino-2'-hydroxy-5'-methylazobenzene are suspended in 80 ml of toluene and 9.8 g of N,N-dimethylaniline. 10.4 g of 2,4,6-trifluorotriazine is added dropwise to the suspension at 20° and the mixture is subsequently stirred for a further 45 minutes. When the condendation reaction has ended, 14.4 g of 1-amino-3-dimethylaminopropane are added dropwise at 20°–25° in the course of 30 minutes. The resulting suspension is subsequently stirred for 2 hours and the dye-stuff which has precipitated is filtered off, washed with toluene and dried at 60° in a circulating air cabinet. The product corresponds to the formula

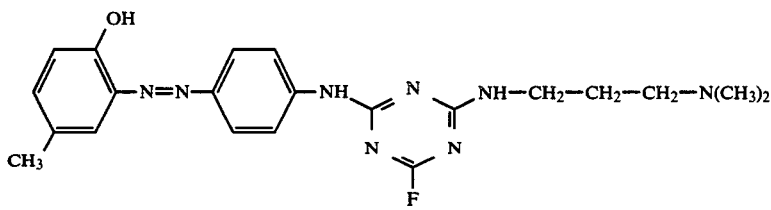

and gives, on polyester/cotton mixtures from acetic acid solution by the processes of Examples 2 and 3, solid, strong yellow dyeings with excellent fastness to light and very good fastness to wet processing and rubbing.

EXAMPLE 75

12 g of 4-amino-4'-methoxy-2-methylazobenzene are introduced into 50 ml of nitrobenzene and 20 ml of dimethylformamide. 7.5 g of 2,4,6-trifluorotriazine are added dropwise to the mixture in the course of 20 minutes and the mixture is subsequently stirred at 25°–30° for 1 hour. The resulting well-formed crystals of the difluorotriazinylaminoazo dyestuff are filtered off, covered twice with nitrobenzene, washed with petroleum ether and dried at 50° in a circulating air cabinet. 7.2 g of the resulting intermediate product are suspended in 60 ml of toluene. 4.1 g of 1-amino-3-dimethylaminopropane are added dropwise at 25°–30° in the course of 30 minutes and the mixture is subsequently stirred for 30 minutes. The resulting dyestuff of the formula ples 2 and 3, solid yellow dyeings which are very fast to light, wet processing and rubbing.

EXAMPLE 76

14 g of 1-(4'-amino-2'-nitrophenylazo)-2-hydroxynaphthalene are suspended in 120 ml of nitrobenzene and 5.8 g of N,N-dimethylaniline. 6.3 g of 2,4,6-trifluorotriazine are added dropwise at 20° in the course of 10 minutes. After subsequently stirring the mixture for one hour until the reaction has ended, 8.2 g of 1-amino-3-dimethylaminopropane are then added dropwise at 20°–25° in the course of 30 minutes and the mixture is subsequently stirred for 2–3 hours. During the dropwise addition of the amine component and the subsequent stirring, the colour of the suspension changes from a brownish to a clear lighter red shade. The dyestuff which has precipitated is filtered off, washed with toluene and petroleum ether and dried at 50° in a circulating air cabinet. The dyestuff of the formula

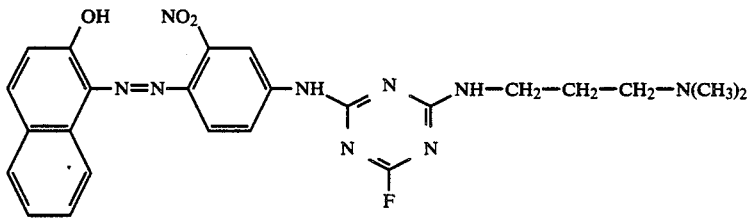

uniformly dyes polyester/cotton mixtures, from an acetic acid solution by the processes of Examples 2 and 3, in red shades with very good fastness properties.

Further azo dyestuffs, listed in Table II, which produce uniform dyeings and prints, which are fast to washing and have the shades indicated, on polyester/cotton fibre blends by the procedure of Examples 2 and 3 can be prepared analogously to the above examples.

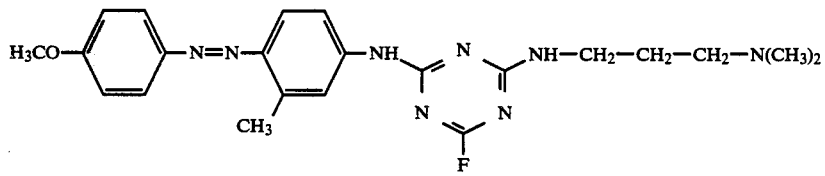

is filtered off, washed with a little toluene and then with petroleum ether and dried at 50° in a circulating air cabinet.

The dyestuff gives, on polyester/cotton fibre blends from a weakly acid solution by the processes of Exam- TABLE II
| Example No. | Dyestuff | Colour shade |
|---|---|---|
| 77 | 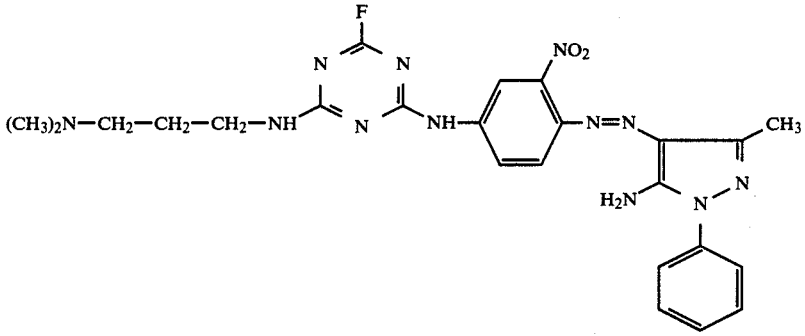 | orange |
| 78 | 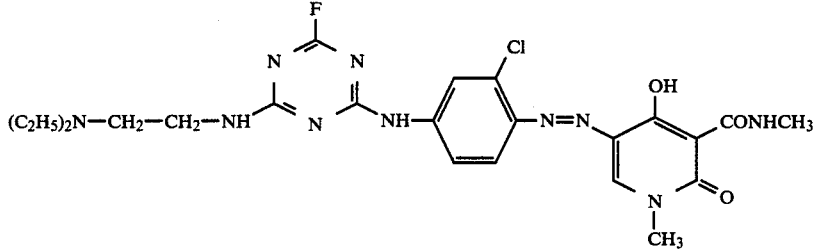 | yellow |
| 79 | 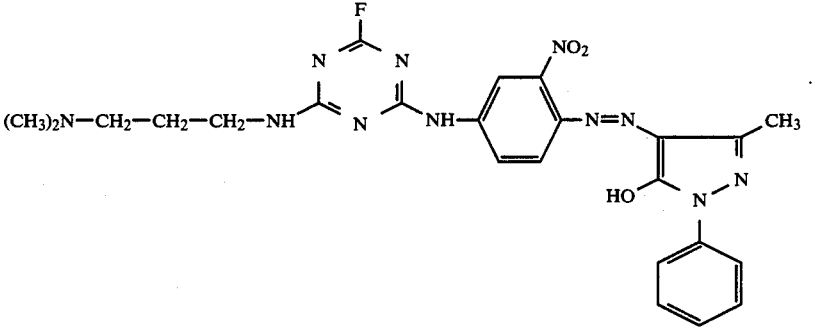 | orange |
| 80 | 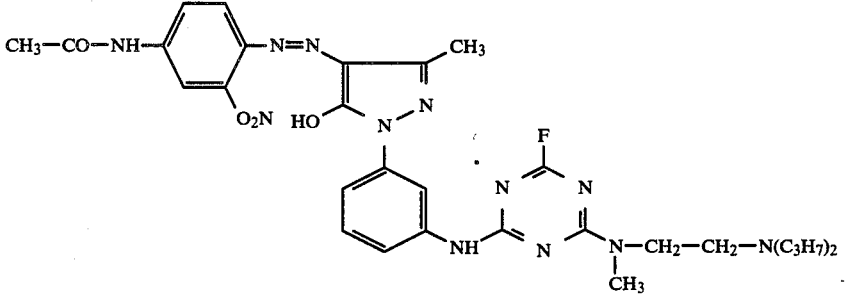 | orange |
| 81 | 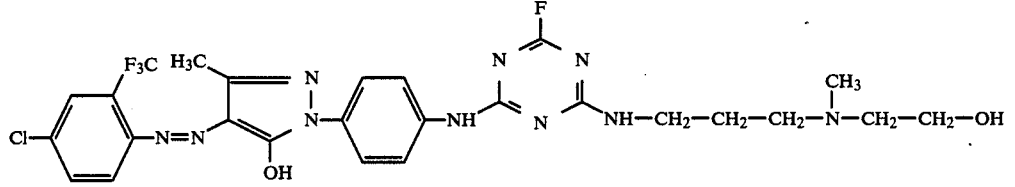 | yellow |

TABLE II-continued
| Example No. | Dyestuff | Colour shade |
|---|---|---|
| 82 | 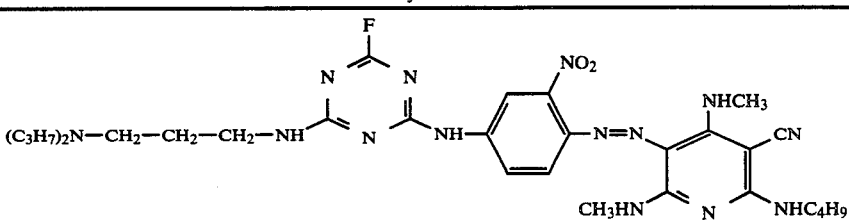 | orange |
| 83 | 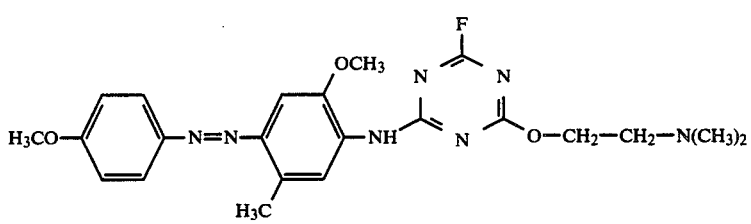 | yellow |
| 84 | 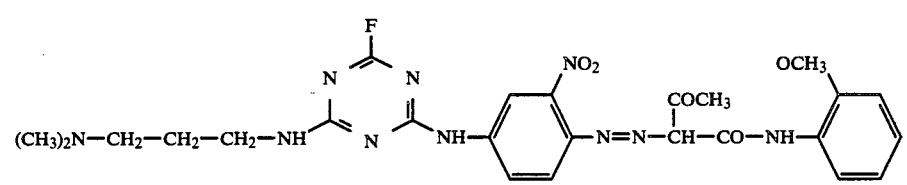 | yellow |
| 85 | 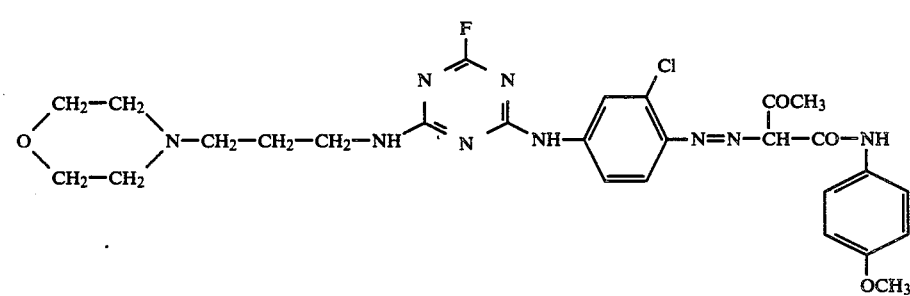 | yellow |
| 86 | 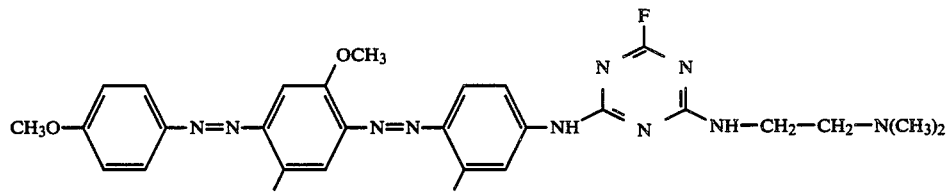 | brown |
| 87 | 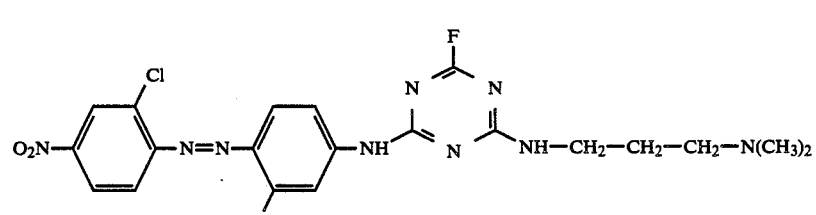 | yellow |
| 88 | 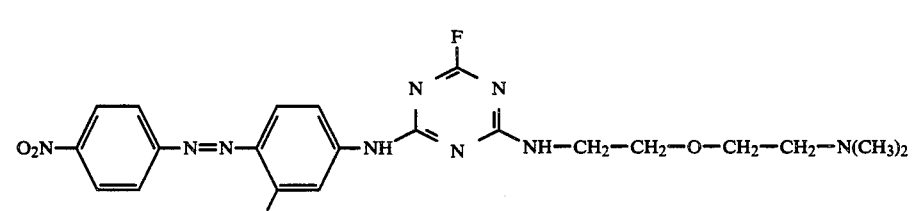 | yellow |

TABLE II-continued

| Example No. | Dyestuff | Colour shade |
|---|---|---|
| 89 | | yellow |
| 90 | | yellow |
| 91 | | yellow |
| 92 | | yellow |
| 93 | | yellow |
| 94 | | orange |

TABLE II-continued

| Example No. | Dyestuff | Colour shade |
|---|---|---|
| 95 | (CH₃)₂N—CH₂—CH₂—CH₂—NH-[triazine with F]-NH-[phenyl]-N=N-[naphthyl with OH and CO-NH-phenyl-OCH₃] | red |
| 96 | [6-nitro-benzothiazol-2-yl]-N=N-[phenyl-N(C₂H₅)₂]-NH-[triazine with F]-NH—CH₂—CH₂—CH₂—N(CH₃)₂ | violet |
| 97 | [thiazol-2-yl]-N=N-[phenyl-N(CH₂—CH₂—OCOCH₃)₂]-NH-[triazine with F]-NH—CH₂—CH₂—N(C₂H₅)₂ | red |
| 98 | [2-OH-5-CH₃-phenyl]-N=N-[phenyl]-NH-[triazine with F]-NH-[phenyl]-CH₂—N(CH₃)₂ | yellow |
| 99 | CH₃O-[phenyl]-N=N-[phenyl-CH₃]-NH-[triazine with F]-NH-[phenyl]-O—CH₂—CH₂—N(C₂H₅)₂ | yellow |
| 100 | C₂H₅O-[phenyl]-N=N-[phenyl with OCH₃ and CH₃]-NH-[triazine with F]-NH-[phenyl]-CH₂—N(CH₃)₂ | yellow |

TABLE II-continued

| Example No. | Dyestuff | Colour shade |
|---|---|---|
| 101 | 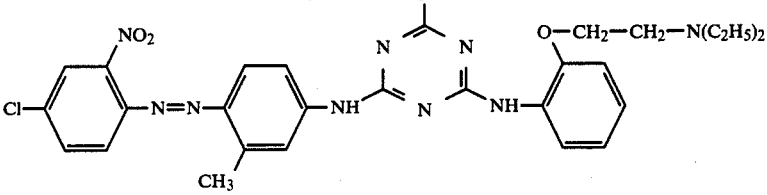 | yellow |
| 102 | 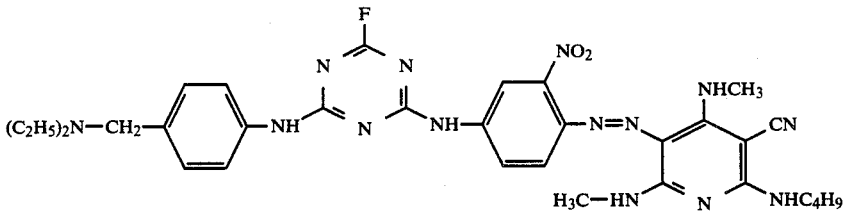 | orange |
| 103 | 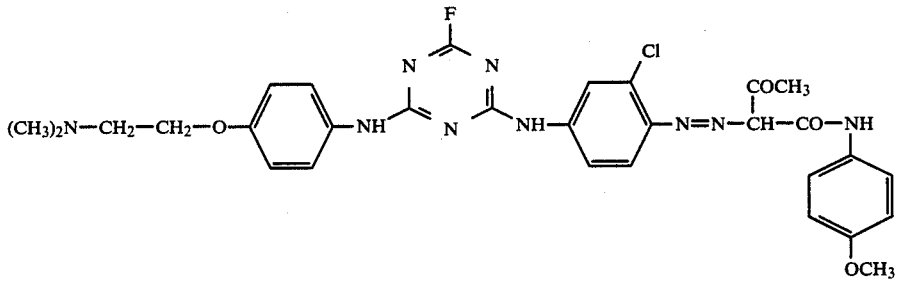 | yellow |
| 104 | 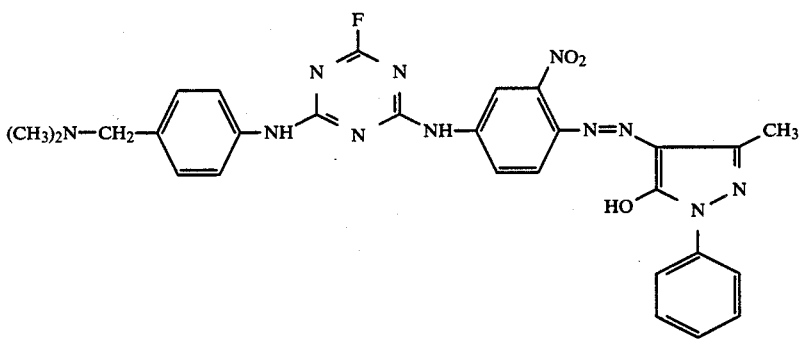 | yellow |

EXAMPLE 105

A solution of 12.2 g of 3-amino-N,N-dimethylaniline in 40 ml of acetone is added dropwise to a solution of 12.9 g of 2,4,6-trifluorotriazine in 40 ml of acetone at $-5°$ to $0°$ in the course of 30 minutes. The suspension of crystals is subsequently stirred for 15 minutes, after which the condensation reaction has ended. 19.5 g of 1-amino-3-dimethylaminopropane are now added dropwise at $20°$ in the course of 45 minutes and the mixture is subsequently stirred for a further hour, until a chromatogram no longer indicates the presence of the difluoroarylaminotriazine. The resulting solution is poured into 500 ml of ice-water and the pH value is adjusted to 4.5 by carefully adding hydrochloric acid. A suspension of a diazonium salt which has been obtained by diazotising 12.4 g of 4-nitroaniline in 200 ml of water and 30 ml of concentrated hydrochloric acid with 6.2 g of sodium nitrite in 100 ml of water is added to the resulting solution. During the addition of the diazonium salt, the pH value of the coupling mixture is kept at 4.5–5.5 with sodium carbonate solution. After subsequently stirring the mixture for two hours, the temperature is allowed to rise gradually to $20°$ and the pH value is kept at 6.0–6.5. Finally, the pH is adjusted to 7, 70 g of sodium chloride are also added to the suspension and the dyestuff is filtered off and washed with dilute sodium chloride solution. The resulting dyestuff corresponds to the formula

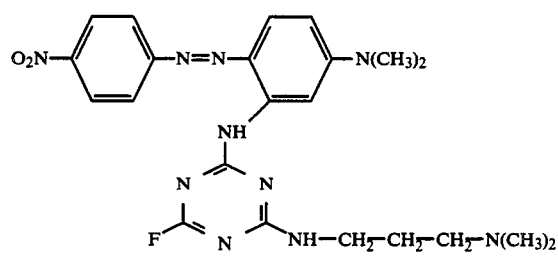

It dyes polyester/cotton mixed fabric, from acetic acid solution by the processes of Examples 2 and 3, in uniform, red colour shades which are fast to wet processing. III and give, on polyester/cotton fibre blends by the methods of Examples 2 and 3, solid dyeings which are fast to washing and have the shades indicated can be prepared by an analogous procedure.

TABLE III

| Example No. | Dyestuff | Colour shade |
|---|---|---|
| 106 | | red |
| 107 | | violet |
| 108 | | red |
| 109 | | red |

TABLE III-continued

| Example No. | Dyestuff | Colour shade |
|---|---|---|
| 110 | (structure) | orange-red |

EXAMPLE 111

14 g of 4'-amino-3-nitro-diphenylamine-1-sulphonic acid N,N-dimethylamide are dissolved in 60 ml of dimethylformamide. After cooling the solution to 0°–5°, 6.3 g of 2,4,6-trifluorotriazine are added dropwise in the course of 5 minutes and the mixture is subsequently stirred for a further 30 minutes until the condensation reaction has ended. 8.6 g of 1-amino-3-dimethylaminopropane are added dropwise at 0°–5° in the course of 30 minutes. The temperature is then allowed to rise to 20°. After subsequently stirring the mixture for half an hour, the reaction has ended. The resulting solution is now added dropwise to 1,500 ml of 10% strength sodium chloride solution at 0°–5°. The precipitate formed is filtered off, stirred again with cold 10% strength sodium chloride solution, filtered off again, rinsed with a little cold 10% strength sodium chloride solution and dried at 60° in a circulating air cabinet. The resulting dyestuff corresponds to the formula and dyes polyester/cotton mixtures in uniform yellow shades with good fastness properties from an acetic acid solution by the processes of Examples 2 and 3.

In the same manner, solid yellow dyeings and prints can be produced on polyester/cotton mixtures by the processes indicated in Examples 2 and 3 using the analogously prepared nitro dyestuffs listed in Table IV.

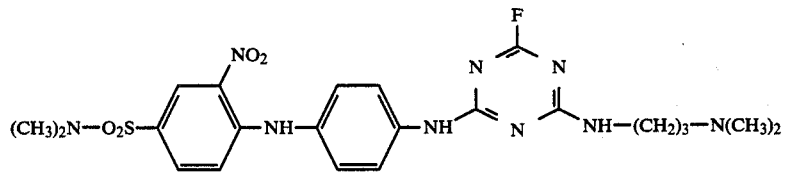

TABLE IV

| Example No. | Dyestuff |
|---|---|
| 112 | (structure) |
| 113 | (structure) |

TABLE IV-continued

| Example No. | Dyestuff |
|---|---|
| 114 | (structure: (CH₃)₂N—CH₂—CH₂—CH₂—NH—C(=N)—N=C(F)—N=C—NH—C₆H₄—NH—C₆H₃(NO₂)—SO₂—NH—C₆H₅ with triazine ring) |
| 115 | (structure: C₆H₅—NH—C₆H₃(NO₂)—SO₂—NH—C₆H₄—NH—triazine(F)—NH—CH₂—CH₂—CH₂—N(CH₃)—CH₂—CH₂—OH) |
| 116 | (structure: CH₃O—C₆H₄—NH—C₆H₃(NO₂)—SO₂—NH—C₆H₄—NH—triazine(F)—NH—CH₂—CH₂—CH₂—N(CH₃)₂) |
| 117 | (structure: CH₃O—C₆H₄—NH—C₆H₃(NO₂)—SO₂—NH—CH₂—CH₂—NH—triazine(F)—NH—CH₂—CH₂—CH₂—N(CH₃)₂) |
| 118 | (structure: H₅C₂O—C₆H₄—NH—C₆H₃(NO₂)—SO₂—NH—C₆H₄—NH—C(=N)—N=C(F)—N=C—N(CH₃)—CH₂—CH₂—CH₂—N(C₂H₅)₂) |

EXAMPLE 119 33.5 g of 1-amino-anthraquinone, 330 ml of nitrobenzene and 41.6 g of cyanuric chloride are heated to 90°. After 1 hour, the temperature is increased to 120° and the mixture is stirred at this temperature for 30 minutes to 1 hour until the condensation reaction has ended. The suspension is cooled to 30° and the yellow crystals are filtered off, washed with methanol and dried at 50° C. in a circulating air cabinet.

11.2 g of 1-(4,6-dichloro-2-triazinylamino)anthraquinone are suspended in 120 ml of toluene. 6.1 g of 1-amino-3-dimethylaminopropane are added dropwise at 25°-30°, this temperature is maintained for 30 minutes and the mixture is then heated to 55°-60° for a further hour. It is subsequently allowed to cool and the dyestuff which has precipitated is filtered off and washed twice with a little toluene and then with petroleum ether. The product is dried at 50° in a circulating air cabinet. It corresponds to the formula

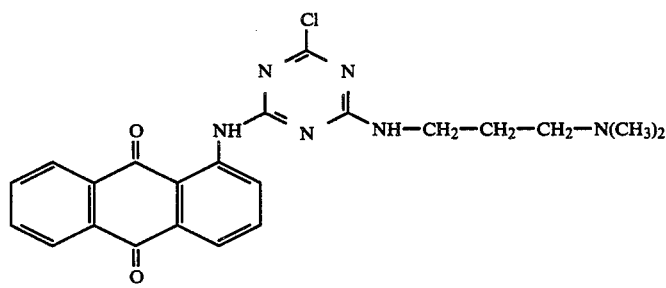

and uniformly dyes polyester/cotton mixed fabric in yellow shades from an acetic acid solution by the processes of Examples 2 and 3.

EXAMPLE 120 11.2 g of 1-(4,6-dichloro-2triazinylamino)anthraquinone are suspended in 120 ml of toluene.

7.2 g of 2-diethylaminoethanol and 3.1 g of triethylamine are added, the mixture is heated to 60°-65°, a further 3.0 g of triethylamine are subsequently added after 7 hours and the temperature is kept at 60°-65° for a further 5 hours. When the condensation reaction has ended, the mixture is cooled, the precipitate is filtered off and the filter cake is washed with a little toluene and then with ligroin and dried at 60° in a circulating air cabinet. After dissolving the resulting dyestuff of the formula

[Structure: 1-amino-anthraquinone substituted with a chloro-triazinyl group bearing an O—CH₂—CH₂—N(C₂H₅)₂ substituent]

in dilute acetic acid, solid yellow dyeings which are fast to light, wet processing and rubbing are produced on polyester/cotton mixtures by the process of Example 3.

Further dyestuffs, summarised in Table V, which produce solid dyeings in the colour shades indicated on polyester/cotton mixtures by the dyeing processes of Examples 2 and 3 can be synthesised in an analogous manner.

TABLE V

| Example No. | Dyestuff | Colour shade |
|---|---|---|
| 121 | [Structure: 2-hydroxy-5-methylphenyl-azo-phenyl-NH-triazinyl(Cl)-NH—CH₂—CH₂—CH₂—N(CH₃)₂] | yellow |
| 122 | [Structure: 4-methoxyphenyl-azo-(2-methoxy-5-methylphenyl)-NH-triazinyl(Cl)-NH—CH₂—CH₂—CH₂—N(CH₃)₂] | yellow |
| 123 | [Structure: CH₃O—C₆H₄—NH—(3-NO₂-C₆H₃)—SO₂—NH—C₆H₄—NH-triazinyl(Cl)-NH—CH₂—CH₂—N(C₂H₅)₂] | yellow |
| 124 | [Structure: quinoline-based dyestuff with triazinyl(Cl)-NH—CH₂—CH₂—CH₂—N(CH₃)₂ substituent] | yellow |

TABLE V-continued
| Example No. | Dyestuff | Colour shade |
|---|---|---|
| 125 | 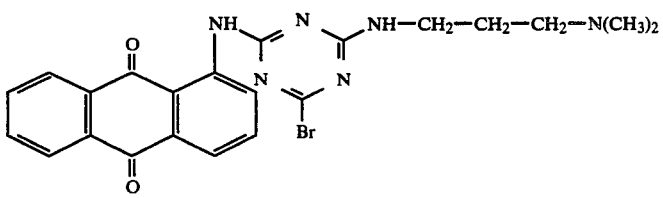 | yellow |
| 126 | 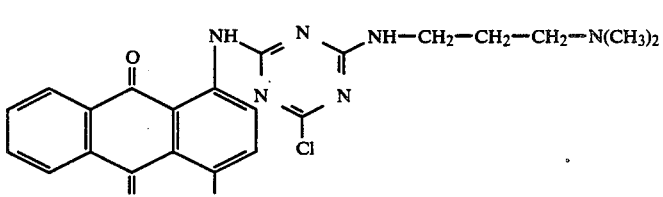 | scarlet |
| 127 | 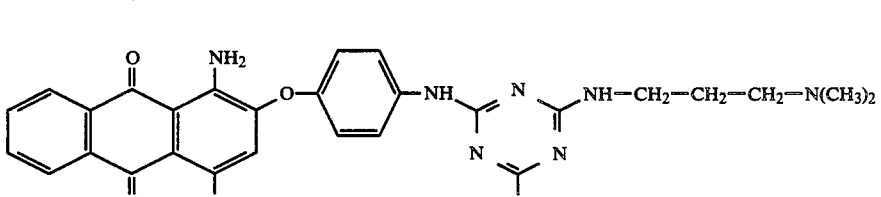 | red |
| 128 | 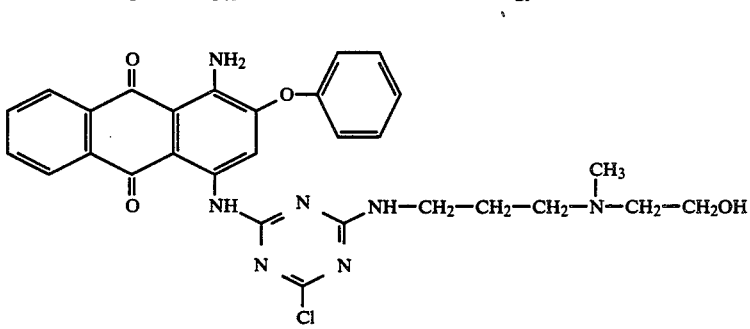 | red-violet |
| 129 | 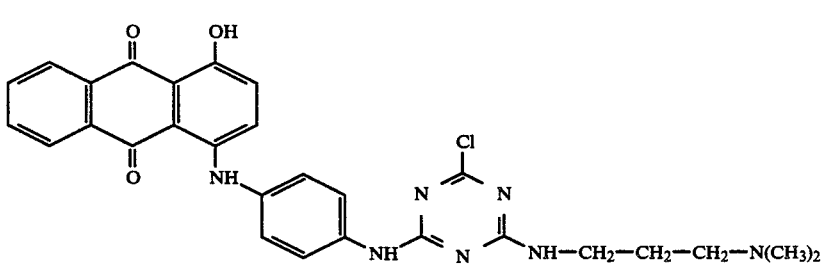 | blue |
| 130 | 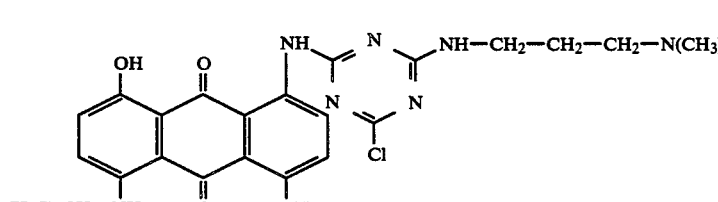 | blue |

EXAMPLE 131 10 g of the intermediate product of the formula

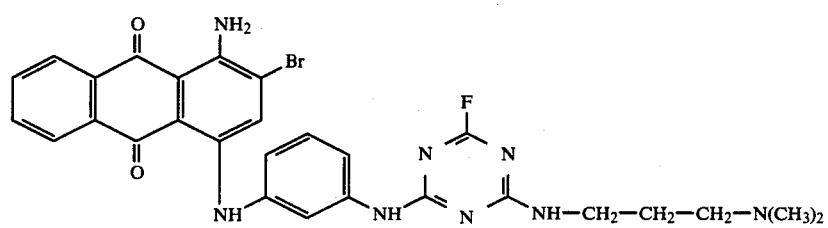

prepared according to Example 6, are suspended in 100 ml of toluene.

2.8 g of 1,4-diaminobutane are added dropwise at 5°–10° in the course of 30 minutes and the mixture is subsequently stirred for 1 hour. The precipitate is filtered off and washed with toluene and then with petroleum ether. After drying at 50° in a circulating air cabinet, a dyestuff is obtained which essentially corresponds to the formula

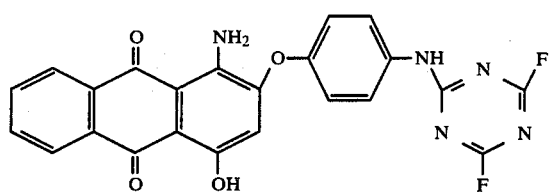

and produces uniform red dyeings, which are fast to wet processing, on polyester/cotton mixed fabric from an acetic acid solution by the processes of Examples 2 and 3.

A similar dyestuff is obtained if 1.8 g of 1,2-diaminoethane are employed instead of the 1,4-diaminobutane.

EXAMPLE 132

16 g of 1-amino-4-(3'-amino-phenylamino)-2-bromoanthraquinone are suspended in 80 ml of toluene and 5.4 g of N,N-dimethylaniline. 6.0 g of 2,4,6-trifluorotriazine are added dropwise at 20° in the course of 10 minutes and the mixture is subsequently stirred for a further 45 minutes. The dyestuff intermediate product has precipitated completely. 8.3 g of 1-amino-3-dimethyl-yl-aminopropane are added dropwise to the suspension at 20°–25° in the course of 30 minutes and the mixture is subsequently stirred for 2 hours in order to bring the condensation reaction to completion. The suspended dyestuff is filtered off, washed with a little toluene and then with petroleum ether and dried at 60° in a circulating air cabinet. The resulting dyestuff of the formula

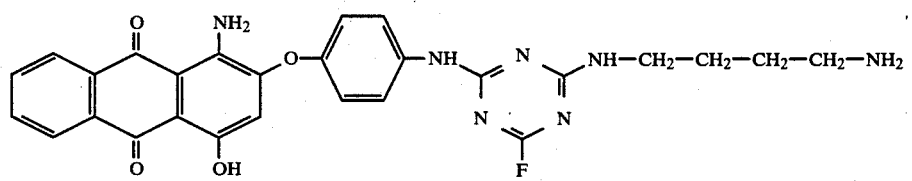

uniformly dyes polyester/cotton mixed fabric, from weakly acid solutions by the processes of Examples 2 and 3, in blue shades which are fast to light, wet processing and rubbing.

A similar dyestuff is obtained if, instead of the 1-amino-3-dimethylaminopropane, an equivalent amount of 1-amino-3-methylaminopropane is employed.

EXAMPLE 133

15 g of the intermediate product of the formula

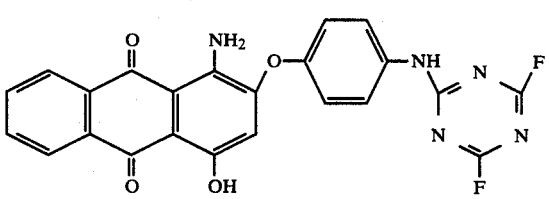

obtained according to Example 6, are suspended in 100 ml of toluene at 20°. 6.2 g of N-2-hydroxyethylpiperazine in 20 ml of toluene are added dropwise in the course of 30 minutes and the mixture is subsequently stirred for a further 30 minutes. The dyestuff which has precipitated is filtered off, washed with 100 ml of toluene and then with petroleum ether and dried at 50° in a circulating air cabinet. The resulting dyestuff corresponds to the formula

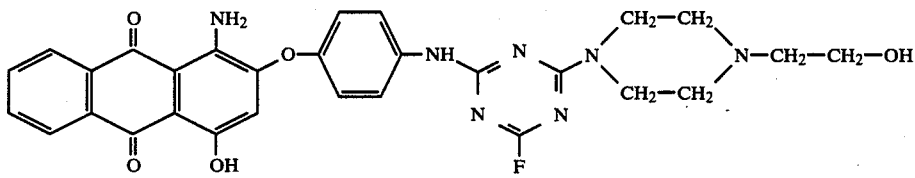

and uniformly dyes polyester/cotton mixtures, by the processes of Examples 2 and 3, in red shades which are very fast to wet processing.

A similar dyestuff is obtained if 4.3 parts of N-methylpiperazine are employed instead of the N-2-hydroxyethylpiperazine.

EXAMPLE 134

19.2 g of 1-amino-4-(3-dimethylamino-1-propylamino)-anthraquinone (prepared by reacting 1-amino-4-bromoanthraquinone-2-sulphonic acid with 1-amino-3-dimethylaminopropane and then eliminating the sulphonic acid group by reduction) are introduced into 150 ml of toluene and 15 ml of dimethylformamide. 5.6 g of 2,4,6-trifluorotriazine are added dropwise to the mixture in the course of 5 minutes. During this addition, the temperature may rise to 30°–35°. The mixture is subsequently stirred for 30 minutes in order to bring the condensation reaction to completion. 11.4 g of phenol are now introduced into the reaction mixture, and 9.1 g of triethylamine are added dropwise. The temperature is then kept at 30°–35° for 30 minutes and at 50° for a further 30 minutes. When the reaction has ended, the mixture is cooled to 20°, the dyestuff which has precipitated is filtered off and the filter cake is washed with toluene and dried at 60° in a circulating air cabinet. The resulting dyestuff of the formula

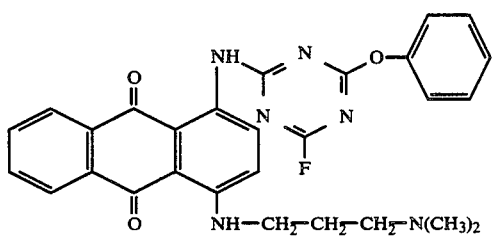

is soluble in dilute acetic acid and dyes polyester/cotton mixtures, in a very uniform manner by the processes of Examples 2 and 3, in blue shades which are fast to wet processing and rubbing.

Further dyestuffs, listed in Table VI, which uniformly dye polyester/cotton mixtures in the colour shades indicated from an acetic acid solution by the processes of Examples 2 and 3 can be prepared analogously.

TABLE VI

| Example No. | Dyestuff | Colour shade |
|---|---|---|
| 135 | (structure) | red |
| 136 | (structure) | blue |
| 137 | (structure) | blue |
| 138 | (structure) | blue |

TABLE VI-continued

| Example No. | Dyestuff | Colour shade |
|---|---|---|
| 139 | (structure) | blue |
| 140 | (structure) | blue |
| 141 | (structure) | blue |
| 142 | (structure) | green |

EXAMPLE 143

19.2 g of 1-amino-4-(3-dimethylamino-1-propylamino)-anthraquinone are reacted with 5.6 g of 2,4,6-trifluorotriazine as in Example 134.

12.4 g of 1-amino-3-dimethylaminopropane are added dropwise to the suspension of the resulting difluorotriazinylaminoanthraquinone in the course of 20 minutes. During this addition, the temperature may rise to 30°-35°. The mixture is then subsequently stirred for one hour, after which the reaction has ended. The precipitate is filtered off, washed with toluene and dried at 60° in a circulating air cabinet. The resulting dyestuff corresponds to the formula

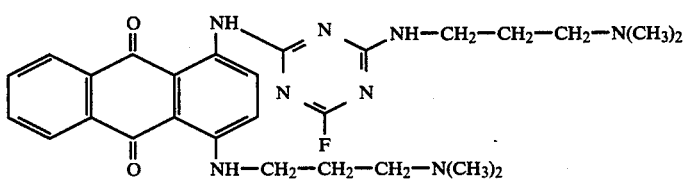

and uniformly dyes polyester/cotton mixed fabric, from an acetic acid solution by the processes of Examples 2 and 3, in blue shades which are fast to wet processing and rubbing.

EXAMPLE 144

5 g of bleached pulp are dispersed in 200 ml of water. A solution of 0.05 g of the dyestuff of Example 6 in 2 ml of 5% strength acetic acid is added and the mixture is stirred at 20° for some minutes and diluted with 500 ml of water. 10 ml of a 1% strength resin size solution and 15 ml of a 1% strength aluminium sulphate solution are then added. The resulting suspension is subsequently stirred for 15 minutes. The coloured mass is filtered on a sheet-forming unit. After drying, a bluish-tinged red-coloured sheet of paper is obtained.

EXAMPLE 145

17.0 g of 4-methylamino-2'-hydroxy-5'-methylazobenzene are suspended or dissolved in 80 ml of toluene and 9.8 g of N,N-dimethylaniline. 10.5 g of 2,4,6-trifluorotriazine are added dropwise at 20° in the course of 10 minutes and the mixture is subsequently stirred for 45 minutes. When the condensation reaction has ended, 14.2 g of N-methylpiperazine are added dropwise in the course of 30 minutes, the resulting suspension is subsequently stirred at 35°–40° for 2 hours and the dyestuff which has precipitated is filtered off at 20°, washed with toluene and dried at 60° in a circulating air cabinet. The product corresponds to the formula

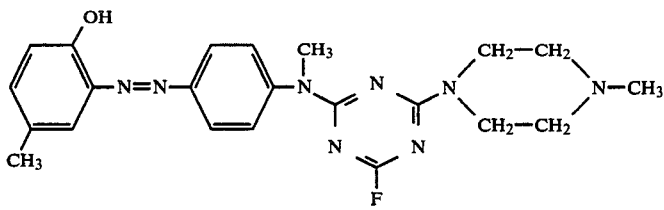

and gives, on polyester/cotton mixtures from an acetic acid solution by the processes of Examples 2 and 3, solid strong yellow dyeings with good fastness to light, wet processing and rubbing.

The dyestuff produces strong yellow dyeings on paper by the process of Example 144.

EXAMPLES 146–153

The following basic fluorotriazine-azo dyestuffs, which give, on polyester/cotton mixtures by the processes of Examples 2 and 3, dyeings which are likewise fast to light, wet processing and rubbing, can also be obtained by the same procedures as described in Examples 74–76.

| Example No. | Dyestuff | Colour shade |
|---|---|---|
| 146 | $C_2H_5O-\phi-N=N-\phi(CH_3)-NH-C(=N)-N=C(F)-N=C-NH-(CH_2)_3-N(CH_3)_2$ (triazine) | yellow |
| 147 | $CH_3O-\phi-N=N-\phi(Cl)(NH-COCH_3)-NH-C(=N)-N=C(F)-N=C-NH-\phi-O-CH_2-CH_2-NH(C_2H_5)_2$ (triazine) | yellow |
| 148 | $C_2H_5O-\phi-N=N-\phi(NH-CO-NH_2)-NH-C(=N)-N=C(F)-N=C-NH-CH_2-CH_2-N(C_2H_5)_2$ (triazine) | yellow |

| Example No. | Dyestuff | Colour shade |
|---|---|---|
| 149 | 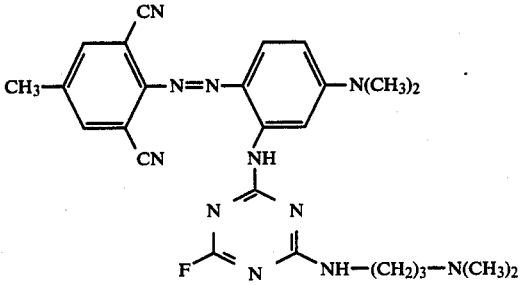 | red |
| 150 | 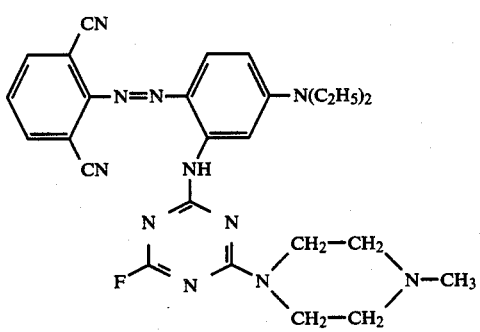 | red |
| 151 | 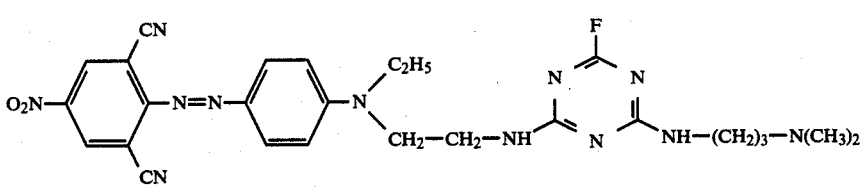 | blue |
| 152 | 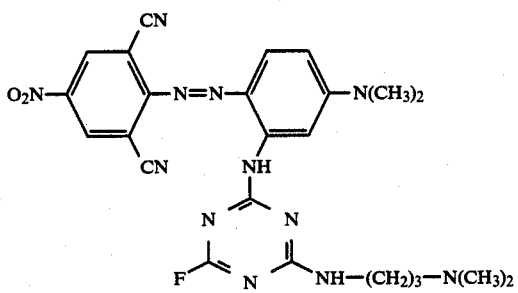 | blue |
| 153 | 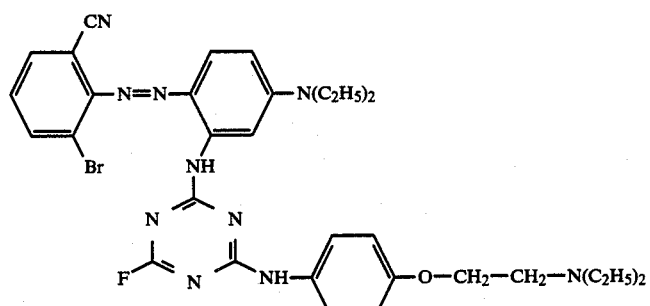 | orange-red |
We claim:
1. Process for dyeing and printing fibre blends of cellulose and synthetic fibres characterized in that a reactive dyestuff which is free from anionic groups and which contains a basic group and a halogenotriazinyl radical, such dyestuff having the formula
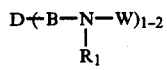
in which D is the radical of an organic azo dyestuff which is free from anionic groups and is free from basic groups, B is a direct bond to a ring carbon atom of D, $R_1$ is H, alkyl, aralkyl or aryl and W is a fluorotriazinyl radical containing a basic group of one of the following formulae

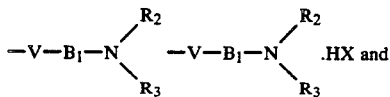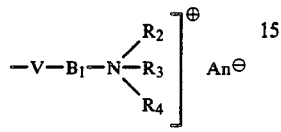

in which

V is

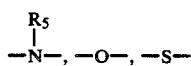

or a direct bond, $B_1$ is a bridge member selected from the group consisting of $C_2$–$C_8$-alkylene, aralkylene, aralkylalkylene and alkarylene or, if

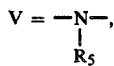

also a direct bond, $R_2$, $R_3$, and $R_4$ and $R_5$ are H or alkyl and $R_2$ and $R_5$ may together represent alkylene, P1 An$^\ominus$ is an anion and HX is an organic or inorganic acid, is used in a single stage process in weakly acidic medium.

2. Process of claim 1 wherein the reactive dyestuff contains a bridge member wherein $B_1$ is $C_2$–$C_8$-alkarylene or alkarylalkylene, or if V=$NR_5$ also a direct bond.

3. Process of claim 1 wherein the reactive dyestuff is one in which

W is a fluorotriazinyl radical containing a basic group of one of the following formulae:

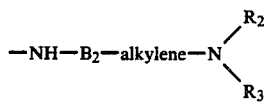

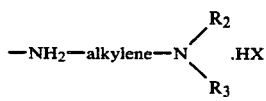

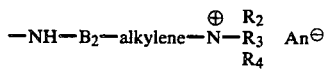

in which $B_2$ denotes a direct bond, phenylene or phenylene-O- and alkylene denotes $C_2$–$C_8$-alkylene.

4. Process of claim 1 wherein the reactive dyestuff is one in which

W is a fluorotriazinyl radical containing a basic group of one of the following formulae

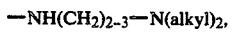

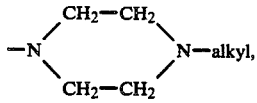

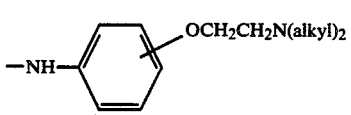

wherein alkyl denotes $C_1$–$C_4$-alkyl which is optionally substituted by OH.

* * * * *

UNITED STATES PATENT AND TRADEMARK OFFICE
CERTIFICATE OF CORRECTION

PATENT NO. : 4,676,803
DATED : June 30, 1987
INVENTOR(S) : Wolfgang Harms, et al.

It is certified that error appears in the above-identified patent and that said Letters Patent is hereby corrected as shown below:

Col. 45, Ex. No. 70       Middle of formula insert --⅔-- as follows:

Signed and Sealed this

Thirteenth Day of September, 1988

Attest:

DONALD J. QUIGG

Attesting Officer    Commissioner of Patents and Trademarks